US012364644B2

(12) United States Patent
Yu et al.

(10) Patent No.: US 12,364,644 B2
(45) Date of Patent: Jul. 22, 2025

(54) MASSAGE APPARATUS

(71) Applicant: Ceragem Co., Ltd., Cheonan-si (KR)

(72) Inventors: Ho Sang Yu, Cheonan-si (KR); Su Hyun Kim, Cheonan-si (KR); Keun Young Paek, Cheonan-si (KR); Dong Myoung Lee, Asan-si (KR)

(73) Assignee: Ceragem Co., Ltd., Cheonan-si (KR)

( * ) Notice: Subject to any disclaimer, the term of this patent is extended or adjusted under 35 U.S.C. 154(b) by 754 days.

(21) Appl. No.: 17/539,057

(22) Filed: Nov. 30, 2021

(65) Prior Publication Data

US 2022/0168173 A1 Jun. 2, 2022

(30) Foreign Application Priority Data

Nov. 30, 2020 (KR) ........................ 10-2020-0163875

(51) Int. Cl.
*A61H 15/00* (2006.01)
*A61G 7/015* (2006.01)

(52) U.S. Cl.
CPC ......... *A61H 15/0078* (2013.01); *A61G 7/015* (2013.01); *A61H 2201/0142* (2013.01); *A61H 2201/0192* (2013.01); *A61H 2201/0207* (2013.01); *A61H 2201/1215* (2013.01); *A61H 2203/0456* (2013.01); *A61H 2205/081* (2013.01)

(58) Field of Classification Search
CPC .................................. A61G 13/00; A47B 9/20
See application file for complete search history.

(56) References Cited

U.S. PATENT DOCUMENTS 7,152,261 B2 * 12/2006 Jackson ............. A61G 13/0036 5/624
2006/0185090 A1 8/2006 Jackson

FOREIGN PATENT DOCUMENTS

| | | | |
|---|---|---|---|
| CN | 107993341 | A | 5/2018 |
| CN | 109330811 | A | 2/2019 |
| CN | 109368542 | A | 2/2019 |
| CN | 109398210 | A | 3/2019 |
| CN | 208851605 | U | 5/2019 |
| CN | 212022448 | U | 11/2020 |
| JP | 2010-046466 | A | 3/2010 |
| KR | 20-0397421 | Y1 | 9/2005 |
| KR | 20-0447971 | Y1 | 3/2010 |
| KR | 10-2012-0128027 | A | 11/2012 |
| KR | 10-2016-0078653 | A | 7/2016 |
| KR | 10-1721144 | B1 | 4/2017 |
| KR | 10-2018-0002330 | A | 1/2018 |
| KR | 10-2020-0021388 | A | 2/2020 |
| WO | WO 2010/098232 | A1 | 9/2010 |

(Continued)

OTHER PUBLICATIONS

English translation WO 2016104950 (Year: 2016).*

(Continued)

*Primary Examiner* — Brandy S Lee
*Assistant Examiner* — Mishal Zahra Hussain
(74) *Attorney, Agent, or Firm* — Knobbe, Martens, Olson & Bear, LLP

(57) ABSTRACT

A massage apparatus, in which a height of an auxiliary portion is adjustable, includes: a body portion configured to support an upper body of a user; and an auxiliary portion connected to the body portion to support a lower body of the user. The auxiliary portion includes a lifting member configured to adjust a height of the auxiliary portion.

18 Claims, 23 Drawing Sheets

(56) References Cited

FOREIGN PATENT DOCUMENTS

| | | | | | |
|---|---|---|---|---|---|
| WO | WO 2015/079584 | A1 | | 6/2015 | |
| WO | WO-2016104950 | A1 | * | 6/2016 | ............. A47C 20/08 |

OTHER PUBLICATIONS

First Office Action dated Sep. 21, 2023 in Chinese Patent Application No. 202111461024.3 in 13 pages.

International Search Report in PCT Application No. PCT/KR2021/017856 dated Feb. 6, 2022 in 3 pages.

* cited by examiner

MASSAGE APPARATUS

CROSS-REFERENCE TO RELATED APPLICATION

This application claims priority to and the benefit of Korean Patent Application No. 10-2020-0163875, filed on Nov. 30, 2020 in the Korean Intellectual Property Office, the disclosure of which is incorporated herein by reference in its entirety.

BACKGROUND

1. Technical Field

The present disclosure relates to a massage apparatus and, more particularly, to a massage apparatus in which a height of an auxiliary portion is adjustable.

2. Discussion of Related Art

Hitherto, there have been generally used thermal treatment beds configured to relax an acute pain or chronic pain occurring in muscles and nervous tissue of a spinal region and caused by long-time work in an inappropriate posture or habituation to this inappropriate posture for a long time and enhancing blood circulation through a thermal stimulus to a pain occurrence region while moving along a body part in order to enhance blood circulation of a body or to release instantaneous stiffness of muscles or the like.

Korean Utility Model Registration No. 20-0397421 (registered on Sep. 26, 2005) discloses the related technology.

SUMMARY

The present disclosure is directed to providing a massage apparatus capable of adjusting a height of an auxiliary portion.

However, technical aspects of the present disclosure are not limited to the above-described technical aspects and other technical aspects may also be present.

According to an aspect of the present disclosure, there is provided a massage apparatus includes a body portion configured to support an upper body of a user and an auxiliary portion connected to the body portion to support a lower body of the user. Here, the auxiliary portion includes a lifting member configured to adjust a height of the auxiliary portion.

The auxiliary portion may be disposed above the body portion when the massage apparatus is not in use and moves in a sliding manner in a longitudinal direction of the body portion to be disposed consecutively with the body portion when the massage apparatus is in use. The lifting member may adjust the height of the auxiliary portion to keep the auxiliary portion horizontal with the body portion when the massage apparatus is in use or not in use.

The lifting member may include a motor including a driving shaft and a wheel bracket assembly connected to the driving shaft and adjusted in height. The wheel bracket assembly may include a connection bracket configured to rotate with the driving shaft and a lift bracket connected to the connection bracket and adjusted in height.

The lift bracket may include a guide hole extending along a width direction, and the connection bracket may include a guide bar inserted into the guide hole.

The guide hole may be formed to extend toward one side in the width direction on the basis of the driving shaft, and the motor may operate to allow the driving shaft to rotate in one direction and in another direction.

The wheel bracket assembly may further include a support bracket to which the motor is fixed. A pair of support plates facing each other may be provided on each of the support bracket and the lift bracket. Further, inner circumferential surfaces of any one pair of support plates may come into contact with and support outer circumferential surfaces of another pair of support plates.

The wheel bracket assembly may further include a support bracket to which the motor is fixed. The lift bracket may include a pair of support plates facing each other. The support bracket may include guide rails slidably coupled to an inner circumferential surface of the lift bracket.

The driving shafts may be provided in front and rear of the motor. A plurality of such connection brackets may be provided to be fixed to the respective driving shafts, and the guide bar may be fixed to the plurality of connection brackets while simultaneously passing through the guide holes formed in the pair of support plates.

The support bracket may include a detection sensor configured to detect a height of the lift bracket.

A first support surface configured to restrict the connection bracket from rotating by a certain angle or more may be formed on the support bracket, and a second support surface configured to prevent the lift bracket from moving upward or downward to a certain height or higher may be formed on the lift bracket.

A first detection protrusion and a second detection protrusion which are detected by the detection sensor may be formed on the connection bracket may be provided in front and the connection bracket provided in the rear, respectively. When the lift bracket moves downward to a certain height or lower, the detection sensor may detect the first detection protrusion. When the lift bracket moves upward to a certain height or higher, the detection sensor may detect the second detection protrusion.

The support bracket may include an auxiliary bracket configured to rotate with the connection bracket to adjust a height of the lift bracket.

The massage apparatus may include a transfer bracket to which the connection bracket and the auxiliary bracket are hinge-fixed to transfer a rotating force of the connection bracket to the auxiliary bracket.

A third support surface configured to support a support bar formed on each of the connection bracket and the auxiliary bracket when the lift bracket moves downward to a certain height or lower may be formed on the transfer bracket.

The lifting member may include a cylinder including a driving shaft and a wheel bracket assembly connected to the driving shaft and adjusted in height.

The wheel bracket assembly may include a support bracket to which the cylinder is fixed and a rotating bracket having one side hinge-fixed to the support bracket and another side to which wheels are rotatably fixed so as to rotate according to an operation of the cylinder and adjust a height of the wheels.

The wheel bracket assembly may further include a connection bracket configured to connect the driving shaft to the rotating bracket to space an extension line of the driving shaft at a certain distance apart from a rotational center of the rotating bracket.

A first support surface and a second support surface which are configured to prevent the rotating bracket from rotating by a certain angle or more may be formed on the support bracket.

The support bracket may include a guide bracket in which a guide hole configured to provide a movement path of the rotating bracket is formed, and the rotating bracket may include a guide bar inserted into the guide hole.

Guide brackets identical to the guide bracket may be provided above and below on the basis of a rotational center of the rotating bracket.

The guide bracket provided above and the guide bracket provided below may be disposed at different distances from the rotational center of the rotating bracket.

The guide bracket provided above may be disposed to be relatively closer to the rotational center of the rotating bracket than the guide bracket provided below.

The support bracket may include a buffer end coming into contact with the ground when the wheels are located at an uppermost point.

The wheel bracket assembly may include a support bracket to which the cylinder is fixed and a rotating bracket having one side hinge-fixed to the driving shaft and another side to which wheels are rotatably fixed so as to rotate according to an operation of the cylinder and adjust a height of the wheels.

The lifting member may include a motor including a driving shaft and a wheel bracket assembly connected to the driving shaft and adjusted in height. The wheel bracket assembly may include a support bracket to which the motor is fixed, a lift bracket adjusted in height according to an operation of the motor, and a guide bracket configured to guide the lift bracket to be adjusted in height.

The guide bracket may include a guide hole formed to provide a movement path of the lift bracket, and the lift bracket may include a guide bar inserted into the guide hole.

The guide hole may include a lift part extending along a height direction and a height fixing part configured to support the lift bracket to fix a height while the lift bracket has moved upward to a certain height.

The driving shaft may include a pinion. The guide bracket may include a rack to allow the guide bracket to move in a width direction when the pinion rotates. The lift part may have an inclination to allow the lift bracket to move upward while the guide bracket moves in the width direction.

Such guide brackets may be provided on both sides in the width direction on the basis of the motor, and a plurality of such guide brackets may each include the rack.

The driving shaft may include a single pinion. A plurality of such racks may include a first rack provided on one side in a width direction on the basis of the motor and a second rack provided on another side. The first rack and the second rack may be disposed in front and rear of the pinion, respectively.

The first rack and the second rack may move in a direction to become closer to or farther from the pinion according to a rotation direction of the pinion.

The lifting member may include a motor including a driving shaft and a wheel bracket assembly connected to the driving shaft and adjusted in height. Here, the wheel bracket assembly may include a support bracket to which the motor is fixed and a lift bracket adjusted in height according to an operation of the motor. The driving shaft may include a pinion. The lift bracket may include a rack adjusted in height according to a rotation direction of the pinion.

A fixing bar passing through the lift bracket may be formed on the support bracket. A fixing hole may be formed in the lift bracket to allow the fixing bar to pass therethrough. The fixing hole may be formed at a position where upward or downward movement of the lift bracket is finished.

BRIEF DESCRIPTION OF THE DRAWINGS

The above and other objects, features and advantages of the present disclosure will become more apparent to those of ordinary skill in the art by describing embodiments thereof in detail with reference to the accompanying drawings, in which:

FIGS. 1A and 1B are perspective views illustrating a massage apparatus according to the present disclosure, wherein FIG. 1A is a view illustrating a state in which a body portion and an auxiliary portion are kept horizontal according to a usage state of the massage apparatus, and FIG. 1B is a view illustrating a state in which the auxiliary portion is disposed above the body portion according to a storage state of the massage apparatus;

FIGS. 2A, 2B, 3A, and 3B are perspective views illustrating a lifting member according to a first embodiment of the present disclosure, wherein FIG. 2A is a view illustrating a state in which a height of the auxiliary portion becomes higher to store the massage apparatus, FIG. 2B is a view illustrating a state in which the height of the auxiliary portion becomes lower to use the massage apparatus, FIG. 3A is an enlarged view illustrating the state in which the height of the auxiliary portion becomes higher from outside the auxiliary portion, and a FIG. 3B is an enlarged view illustrating the state in which the height of the auxiliary portion becomes lower from inside the auxiliary portion;

FIGS. 4, 5A, and 5B are perspective views illustrating a lifting member according to a second embodiment of the present disclosure, wherein FIG. 5A is a view illustrating a state in which a height of the auxiliary portion becomes higher to store the massage apparatus, and FIG. 5B is a view illustrating a state in which the height of the auxiliary portion becomes lower to use the massage apparatus;

FIGS. 6A and 6B are perspective views illustrating a lifting member according to a third embodiment of the present disclosure, wherein FIG. 6A is a view illustrating a state in which a height of the auxiliary portion becomes higher to store the massage apparatus, and FIG. 6B is a view illustrating a state in which the height of the auxiliary portion becomes lower to use the massage apparatus;

FIGS. 7A, 7B, 8A, and 8B are views illustrating a lifting member according to a fourth embodiment of the present disclosure, wherein FIG. 7A is a perspective view illustrating a state in which a height of the auxiliary portion becomes higher to store the massage apparatus, FIG. 7B is a perspective view illustrating a state in which the height of the auxiliary portion becomes lower to use the massage apparatus, FIG. 8A is a side view illustrating the state in which the height of the auxiliary portion becomes higher to store the massage apparatus, and FIG. 8B is a side view illustrating the state in which the height of the auxiliary portion becomes lower to use the massage apparatus;

FIGS. 9, 10A, and 10B are views illustrating a lifting member according to a fifth embodiment of the present disclosure, wherein FIG. 9 is a perspective view illustrating the auxiliary portion from inside, FIG. 10A is a side view illustrating a state in which a height of the auxiliary portion becomes higher to store the massage apparatus, and FIG. 10B is a side view illustrating a state in which the height of the auxiliary portion becomes lower to use the massage apparatus;

FIGS. 11A and 11B are perspective views illustrating a lifting member according to a sixth embodiment of the present disclosure, wherein FIG. 11A is a view illustrating a state in which a height of the auxiliary portion becomes higher to store the massage apparatus, and FIG. 11B is a view illustrating a state in which the height of the auxiliary portion becomes lower to use the massage apparatus;

FIGS. 12A and 12B are views illustrating a lifting member according to a seventh embodiment of the present disclosure, wherein FIG. 12A is a perspective view illustrating a state in which a height of the auxiliary portion becomes lower to use the massage apparatus, and FIG. 12B is a perspective view illustrating a state in which the height of the auxiliary portion becomes higher to store the massage apparatus;

FIGS. 13A and 13B are views illustrating a lifting member according to an eighth embodiment of the present disclosure, wherein FIG. 13A is a perspective view illustrating a state in which a height of the auxiliary portion becomes higher to store the massage apparatus, and FIG. 13B is a perspective view illustrating a state in which the height of the auxiliary portion becomes lower to use the massage apparatus;

FIGS. 14A, 14B, 15A, and 15B are views illustrating a lifting member according to a ninth embodiment of the present disclosure, wherein FIG. 14A is a perspective view illustrating a state in which a height of the auxiliary portion becomes higher to store the massage apparatus, FIG. 14B is a perspective view illustrating a state in which the height of the auxiliary portion becomes lower to use the massage apparatus, FIG. 15A is a side view illustrating the state in which the height of the auxiliary portion becomes higher to store the massage apparatus, and FIG. 15B is a side view illustrating the state in which the height of the auxiliary portion becomes lower to use the massage apparatus; and FIGS. 16A and 16B are views illustrating a lifting member according to a tenth embodiment of the present disclosure, wherein FIG. 16A is a perspective view illustrating a state in which a height of the auxiliary portion becomes higher to store the massage apparatus, and FIG. 16B is a perspective view illustrating a state in which the height of the auxiliary portion becomes lower to use the massage apparatus.

DETAILED DESCRIPTION OF EMBODIMENTS

Figure 1A:
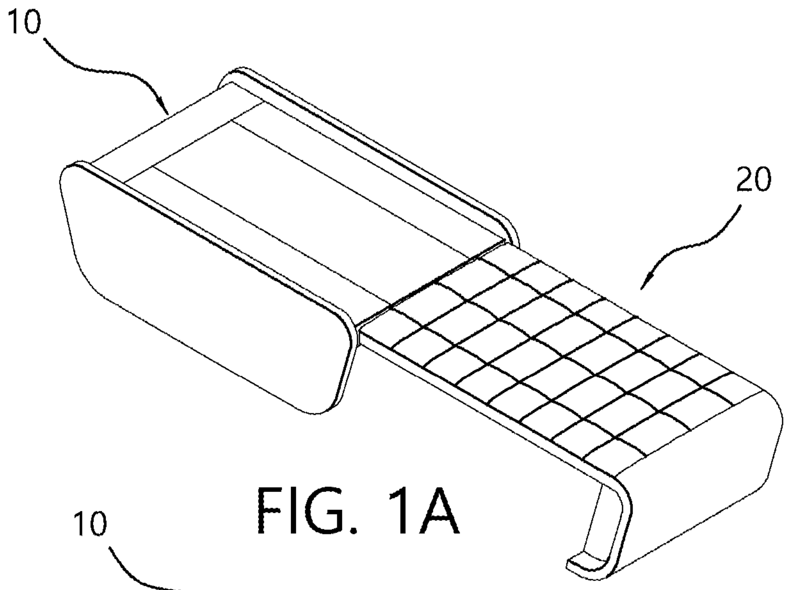

Hereinafter, embodiments of the present disclosure will be described in detail to be implemented by one of ordinary skill in the art with reference to the drawings. The present disclosure may be implemented in a variety of shapes and will not be limited to the embodiments described herein. To clearly describe the present disclosure, a description of irrelevant parts will be omitted. Throughout the specification, like or similar components will be referred to as like reference numerals.

Throughout the specification, the terms "comprise," "have," or the like are used herein to specify the presence of implemented features, numbers, stages, operations, elements, components or combinations thereof but do not preclude the presence or addition of one or more other features, numbers, stages, operations, elements, components, or combinations thereof. When it is stated that one part of a layer, film, region, plate, or the like is disposed "above" another part, not only one part may be "directly above" the other part but also another part may be present therebetween. On the other hand, when it is stated that one part of a layer, film, region, plate, or the like is disposed "below" another part, not only one part may be "directly below" the other part but also another part may be present therebetween.

A thermal treatment apparatus used in thermal treatment may be formed to have a general bed shape such that the apparatus may occupy a great deal of space even when not in use. To address this, a thermal treatment apparatus may be configured to allow a body portion supporting an upper body of a user and an auxiliary portion supporting a lower body of the user to mutually slide.

In this slide type thermal treatment apparatus, it may be important to keep the body portion and the auxiliary portion horizontal when the apparatus is in use. This is to allow the user to feel comfortable while lying down by keeping the upper body and lower body horizontal.

However, the thermal treatment apparatus is used while the body portion and the auxiliary portion are kept horizontal, and after use, the auxiliary portion is disposed above the body portion by moving the auxiliary portion in a sliding manner to be accommodated. Here, since a height of the auxiliary portion is fixed in accordance with a state of using the thermal treatment apparatus, there is a difficulty of slightly lifting and moving the auxiliary portion in a sliding manner above the body portion for accommodation after use.

When the height of the auxiliary portion is fixed in accordance with a storage state of the thermal treatment apparatus (state in which the auxiliary portion is disposed above the body portion) to address the foregoing, the auxiliary portion may be at a height higher than the body portion when the auxiliary portion is moved in a sliding manner to use the thermal treatment apparatus so that the body portion and the auxiliary portion may not be kept horizontal.

Figure 1B:
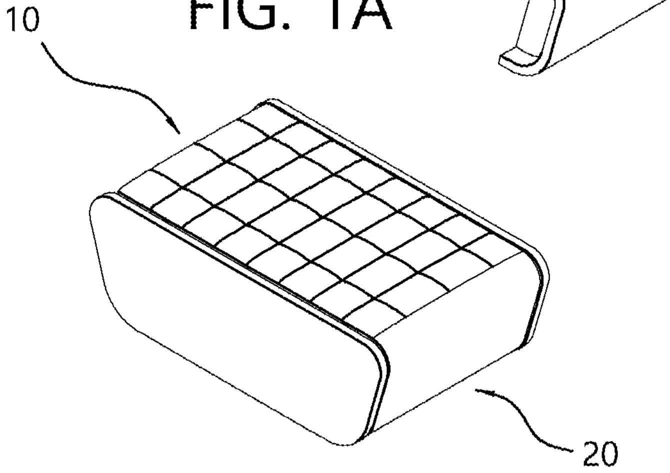

FIGS. 1A and 1B are perspective views illustrating a massage apparatus according to embodiments of the present disclosure, wherein FIG. 1A is a view illustrating a state in which a body portion and an auxiliary portion are kept horizontal according to a use state of the massage apparatus, and FIG. 1B is a view illustrating a state in which the auxiliary portion is disposed above the body portion according to a storage state of the massage apparatus.

As described above, when the massage apparatus is in use, massages may be provided while a body portion 10 and an auxiliary portion 20 are kept horizontal so as to allow a user to feel comfortable by keeping an upper body and a lower body of the user horizontal when the user lies down.

To this end, as shown in FIGS. 1A and 1B, the massage apparatus according to the present disclosure includes the body portion 10 configured to support the upper body of the user and the auxiliary portion 20 connected to the body portion 10 to support the lower body of the user. The auxiliary portion 20 includes a lifting member configured to adjust a height of the auxiliary portion 20.

Particularly, when the massage apparatus is not in use, the auxiliary portion 20 is disposed above the body portion 10. When the massage apparatus is in use, the auxiliary portion 20 moves in a sliding manner in a longitudinal direction of the body portion 10 and is disposed continuously with the body portion 10. The lifting member adjusts a height of the auxiliary portion 20 to keep the auxiliary portion 20 and the body portion 10 horizontal when the massage apparatus is in use or not in use.

That is, in the case of massage apparatus in which the auxiliary portion 20 is disposed above the body portion 10, since it is necessary that a height of the auxiliary portion 20 differs depending on a use state and a storage state, as described above, when the auxiliary portion 20 includes the lifting member, the height of the auxiliary portion 20 is adjusted according to each state so that the massage apparatus may be stably stored and the user may comfortably use the massage apparatus.

Even when wheels 40 are provided on the auxiliary portion 20 to allow the auxiliary portion 20 to easily move in a sliding manner, since the wheels 40 always support the ground through the auxiliary portion 20 being adjusted in height, the auxiliary portion 20 may easily move in a sliding manner regardless of a storage state or a use state of the massage apparatus.

In addition, since the height of the auxiliary portion 20 is adjusted to be higher than the body portion 10 as necessary, blood circulation of the user may be performed smoothly.

Figure 2A:
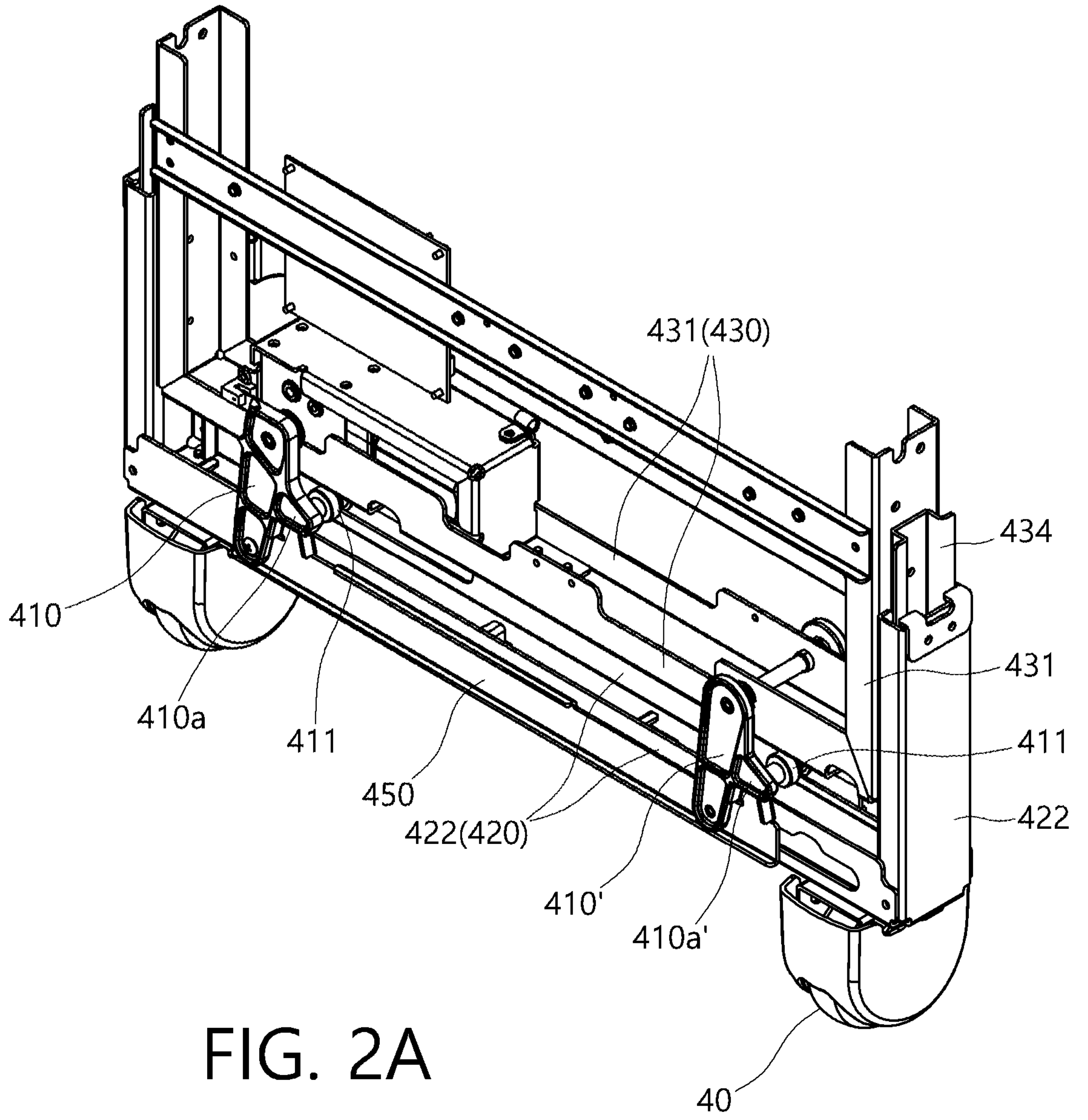
Figure 2B:
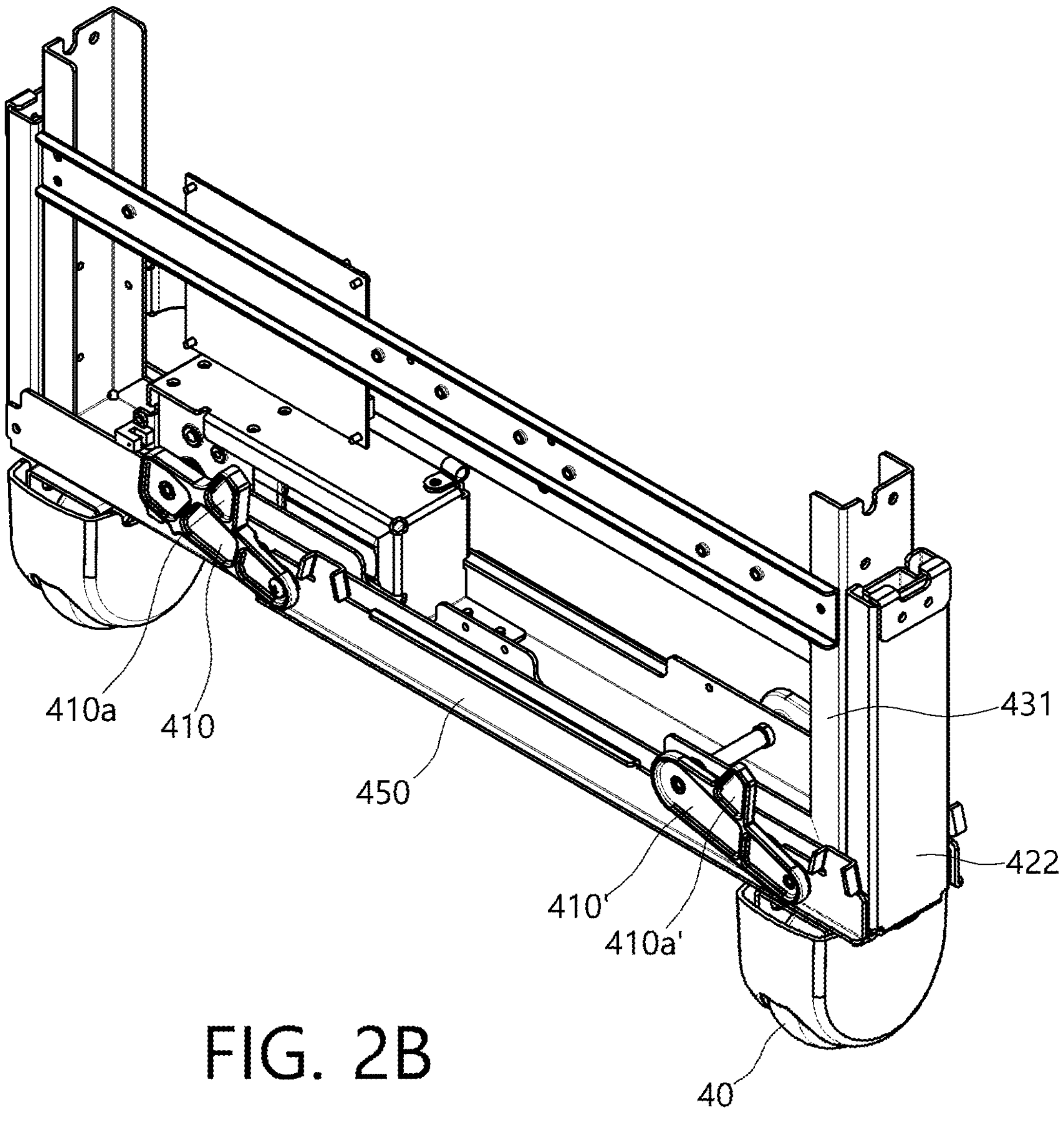
Figure 3A:
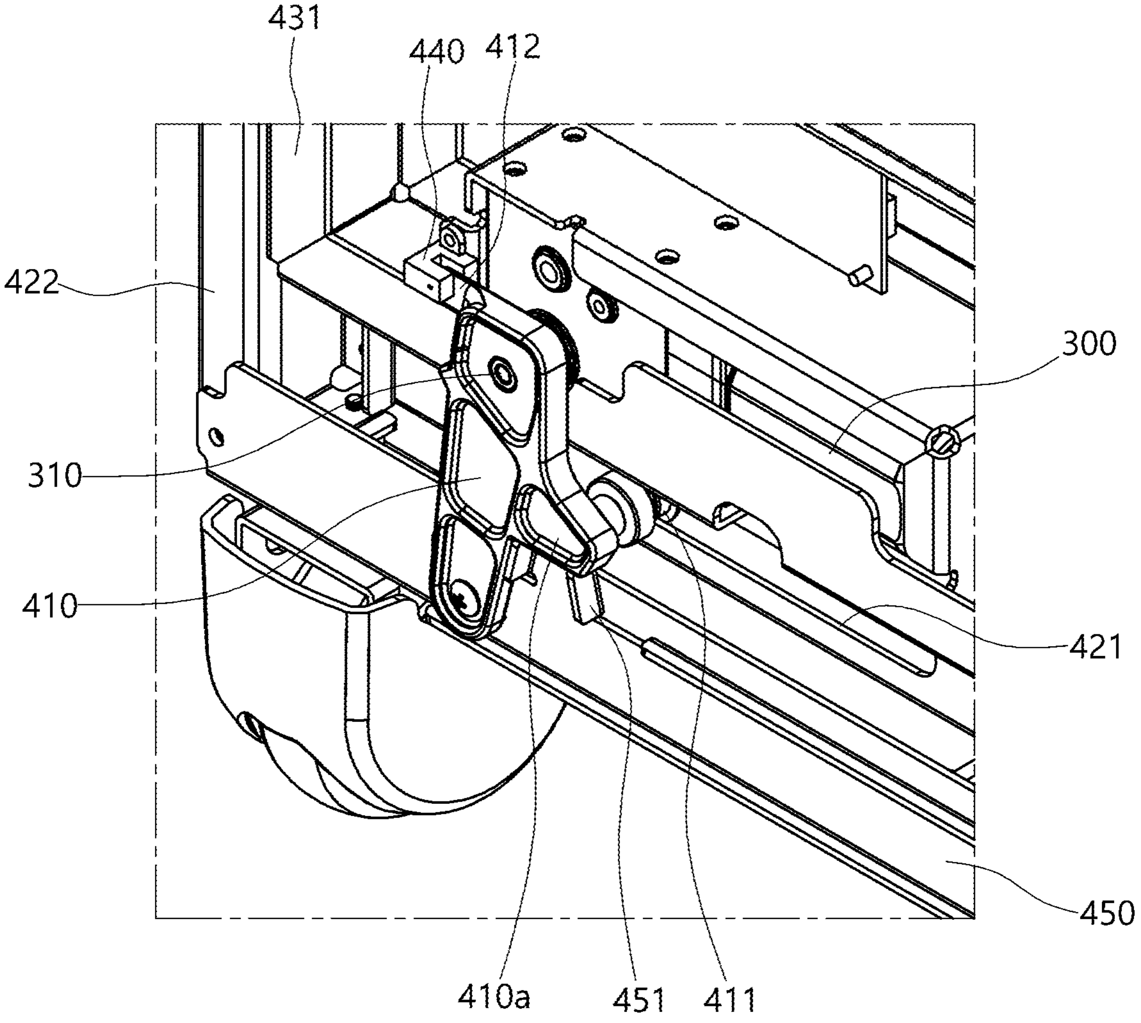
Figure 3B:
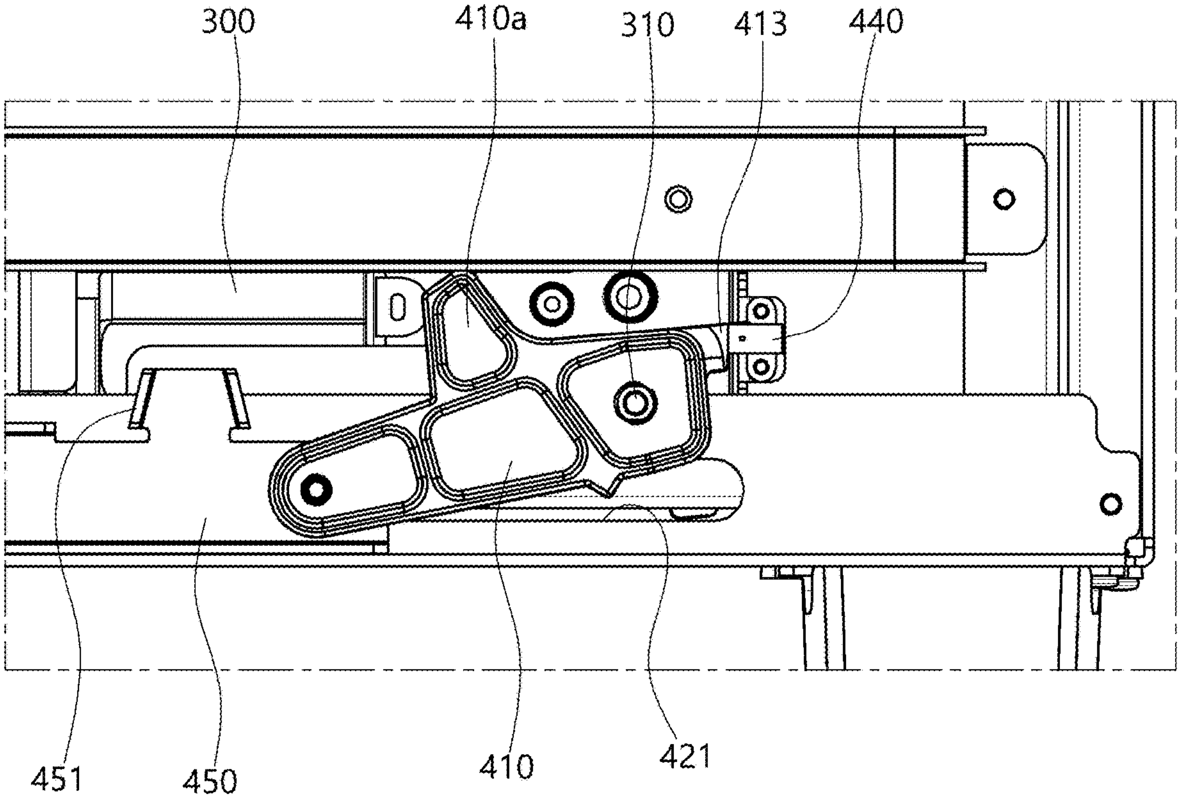

FIGS. 2A, 2B, 3A, and 3B are perspective views illustrating a lifting member according to a first embodiment of the present disclosure, wherein FIG. 2A is a view illustrating a state in which a height of the auxiliary portion becomes higher to store the massage apparatus, FIG. 2B is a view illustrating a state in which the height of the auxiliary portion becomes lower to use the massage apparatus, FIG. 3A is an enlarged view illustrating the state in which the height of the auxiliary portion becomes higher from outside the auxiliary portion, and a FIG. 3B is an enlarged view illustrating the state in which the height of the auxiliary portion becomes lower from inside the auxiliary portion.

As shown in FIGS. 2A and 2B, a wheel bracket assembly 400 further includes a support bracket 430 to which a motor 300 is fixed. A pair of support plates 422 facing each other is provided on a lift bracket 420. Guide rails 434 slidably coupled to an inner circumferential surface of the lift bracket 420 may be provided on the support bracket 430. With this configuration, as described above, even when a load of the auxiliary portion 20 is applied, the lift bracket 420 may stably move upward or downward.

Driving shafts 310 may be provided in a front and rear of the motor 300, a plurality of connection brackets 410 may be provided to be fixed to the respective driving shafts 310, and a guide bar 411 may be fixed to the plurality of connection brackets 410 while passing through guide holes 421 formed in the pair of support plates 422 simultaneously.

Figure 4:
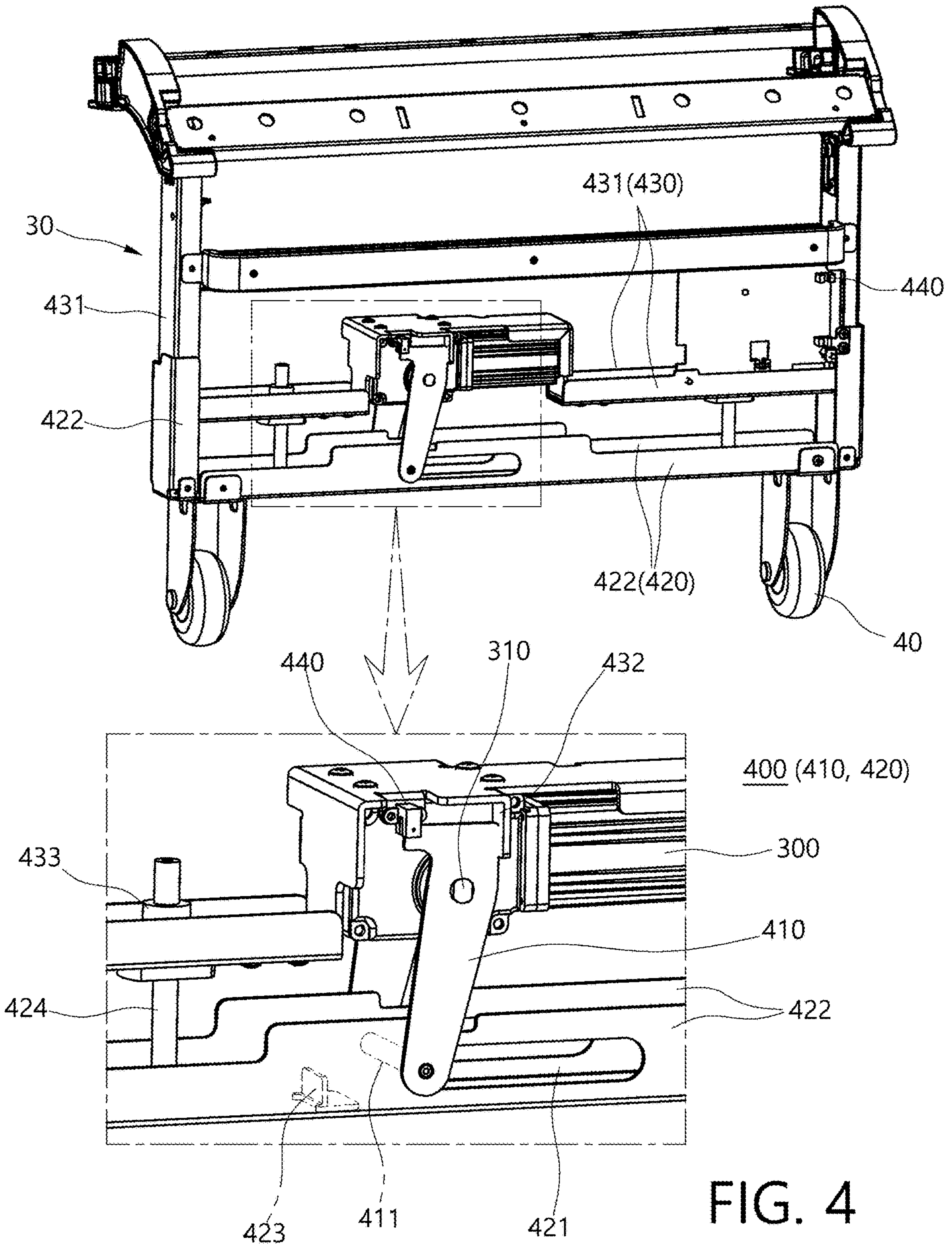

That is, as shown in FIGS. 2A, 2B, and 4, when the plurality of connection brackets 410 are provided in the front and rear of the motor 300 to face each other and both sides of the guide bar 411 are configured to be fixed to the connection brackets 410, the guide bar 411 may be supported by one side or the other side of the guide holes 421, and thus upward movement or downward movement of the lift bracket 420 may be stably performed.

Here, as shown in FIGS. 3A, 3B, and 4, a detection sensor 440 configured to detect a height of the lift bracket 420 may be provided on the support bracket 430.

Figure 5A:
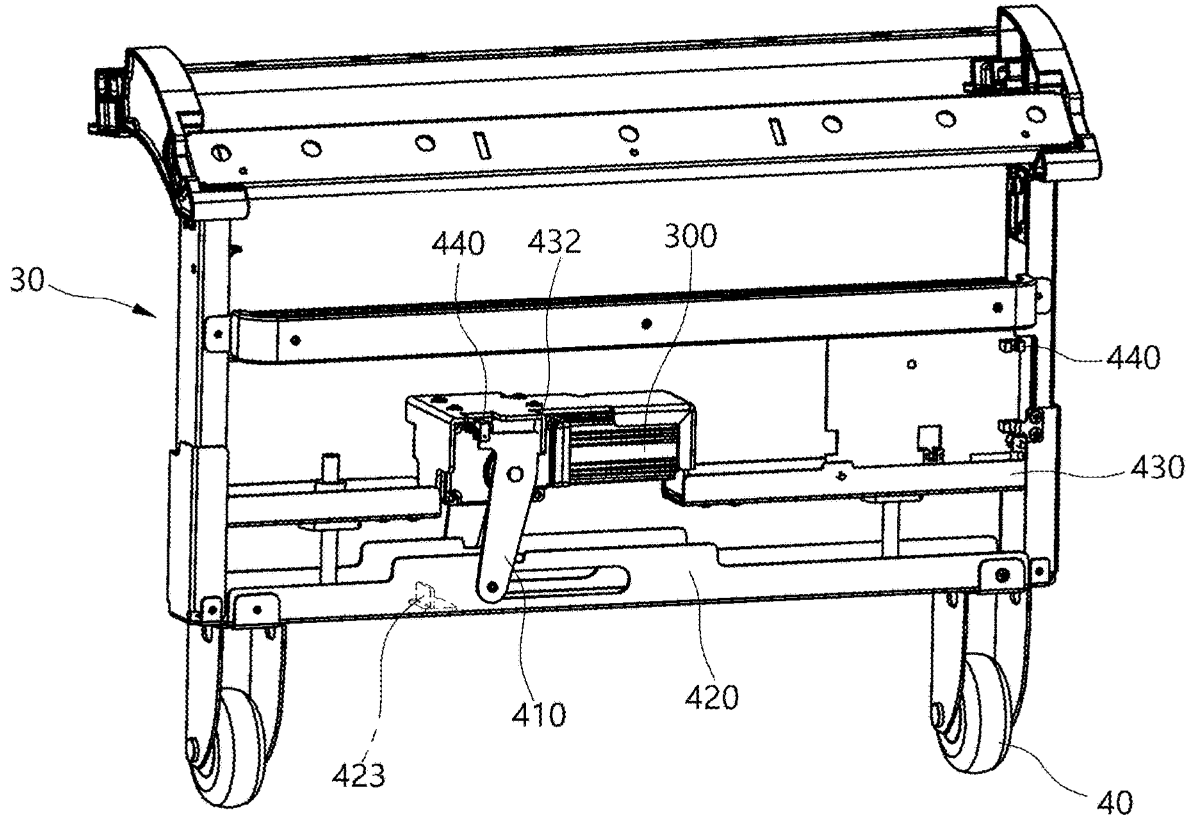
Figure 5B:
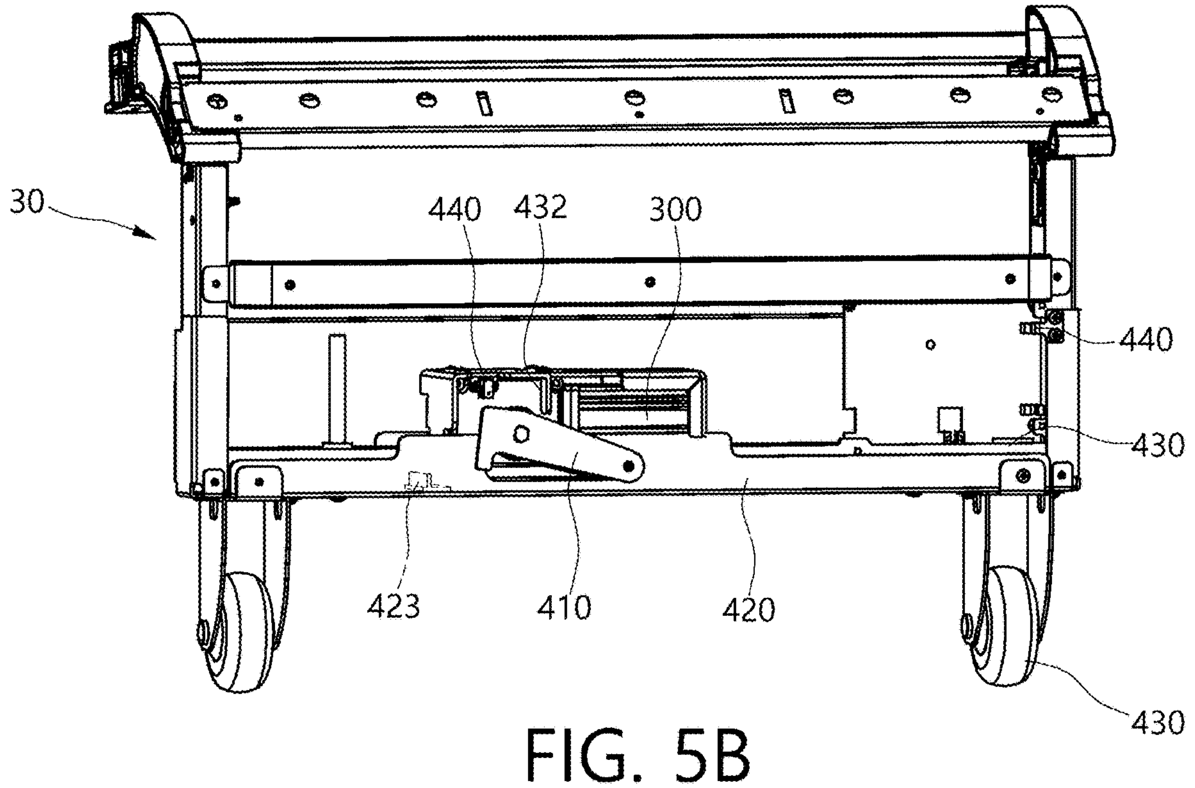

The detection sensor 440 performs detection to prevent the lift bracket 420 from moving upward to a certain height or higher or moving downward to a certain height or lower. As shown in FIG. 5A, a part that is detectable by the detection sensor 440 at a point in time when it is necessary to finish downward movement of the lift bracket 420 may be formed on the connection bracket 410 to indirectly detect a height of the lift bracket 420. Otherwise, as shown in FIG. 5B, a part that is detectable by the detection sensor 440 at a point in time when it is necessary to finish upward movement of the lift bracket 420 may be formed on the lift bracket 420 to directly detect the height of the lift bracket 420.

Otherwise, as shown in FIGS. 3A and 3B, all parts that are detectable by the detection sensor 440 to indirectly detect upward movement or downward movement height of the lift bracket 420 may be formed on the connection bracket 410. That is, FIG. 3A is an enlarged view of the auxiliary portion 20 from outside in which a part where a downward movement height of the lift bracket 420 is detectable is formed on the connection bracket 410 provided in front of the motor 300, and FIG. 3B is an enlarged view of the auxiliary portion 20 from inside in which a part where an upward movement height of the lift bracket 420 is detectable is formed on the connection bracket 410 provided in the rear of the motor 300.

When the detection sensor 440 is provided as described above, the upward movement height and downward movement height of the lift bracket 420 may be precisely detected so as to control an operation of the motor 300.

As shown in FIG. 4, a first support surface 432 configured to restrict the connection bracket 410 from rotating by a certain angle or greater may be formed on the support bracket 430, and a second support surface 423 configured to prevent the lift bracket 420 from moving upward to a certain height or higher may be formed on the lift bracket 420.

That is, although the upward movement height and the downward movement height of the lift bracket 420 are controlled using a method of controlling an operation of the motor 300 using the detection sensor 440, when a load of the user is applied while the height of the lift bracket 420 is fixed as described above, a great load is applied to the motor 300. As such a process is repeated, durability of the motor 300 may be degraded. However, as described above, when downward movement of the lift bracket 420 is finished, the connection bracket 410 is configured not to further rotate using the first support surface 432 formed on the support bracket 430 so that structurally stable support is possible even when the load is applied to the motor 300. When the upward movement of the lift bracket 420 is finished, the lift bracket 420 is configured not to move further upward using the second support surface 423 formed on the lift bracket 420 so that structural support is possible even when the load is applied to the motor 300.

Otherwise, as shown in FIGS. 3A and 3B, a first detection protrusion 412 and a second detection protrusion 413 which are detected by the detection sensor 440 are formed on the connection bracket 410 provided in front and the connection bracket 410 provided in the rear, respectively. Here, the detection sensor 440 may detect the first detection protrusion 412 when the lift bracket 420 moves downward to a certain height or lower, and the detection sensor 440 may detect the second detection protrusion 413 when the lift bracket 420 moves upward to a certain height or higher.

That is, when the first detection protrusion 412 and the second detection protrusion 413 are formed on the connection brackets 410, respectively, and the detection sensor 440 detects the first detection protrusion 412 or the second detection protrusion 413 while the lift bracket 420 moves upward or downward, the operation of the motor 300 is stopped so as to control the upward or downward movement height of the lift bracket 420.

As described above, when the detection sensor 440 is provided as described above, the upward movement height and downward movement height of the lift bracket 420 may be precisely detected so as to control the operation of the motor 300.

As shown in FIGS. 2A and 2B, the support bracket 430 may include an auxiliary bracket 410' rotating with the connection bracket 410 to adjust a height of the lift bracket 420.

The connection bracket 410 and the auxiliary bracket 410' are configured as described above to support one side and the other side of the lift bracket 420, respectively, and thus the lift bracket 420 may stably move upward and downward.

Here, a transfer bracket 450 to which the connection bracket 410 and the auxiliary bracket 410' are hinge-fixed to transfer a rotating force of the connection bracket 410 to the auxiliary bracket 410' may be provided.

That is, when the connection bracket 410 rotates as the driving shaft 310 of the motor 300 rotates, the rotating force of the connection bracket 410 is transferred through the transfer bracket 450 so as to rotate together with the auxiliary bracket 410'. When configured as described above, the connection bracket 410 and the auxiliary bracket 410' rotate at the same speed so that the lift bracket 420 may easily move upward or downward.

Since only the motor 300 configured to rotate the connection bracket 410 is necessary, a structure is simplified to reduce a risk of defects, an overall weight of the massage apparatus is reduced, and a manufacturing cost is reduced.

A third support surface 451 configured to support bars 410*a* and 410*a'* formed on the connection bracket 410 and the auxiliary bracket 410', respectively, when the lift bracket 420 moves downward to a certain height or lower may be formed on the transfer bracket 450.

When the upward movement height and the downward movement height of the lift bracket 420 are controlled using a method of controlling the operation of the motor 300 using the detection sensor 440 while the downward movement of the lift bracket 420 is simultaneously finished, the support bars 410*a* and 410*a'* formed on the connection bracket 410 and the auxiliary bracket 410' are supported using the third support surface 451 formed on the transfer bracket 450, respectively, so as to perform structurally stable support even when the load of the user is applied while the massage apparatus is in use.

Further, since the lift bracket 420 does not move further upward when the upward movement of the lift bracket 420 is finished in the case of an additional support surface being formed on the lift bracket 420, structural stability may be secured even when the load of the user is applied.

FIGS. 4, 5A, and 5B are perspective views illustrating a lifting member according to a second embodiment of the present disclosure, wherein FIG. 5A is a view illustrating a state in which a height of the auxiliary portion becomes higher to store the massage apparatus, and FIG. 5B is a view illustrating a state in which the height of the auxiliary portion becomes lower to use the massage apparatus.

As shown in FIG. 4, the lifting member 30 includes the motor 300 including the driving shaft 310 and the wheel bracket assembly 400 connected to the driving shaft 310 and adjusted in height. Here, the wheel bracket assembly 400 may include the connection bracket 410 rotating with the driving shaft 310 and the lift bracket 420 connected to the connection bracket 410 and adjusted in height.

That is, when the motor 300 is driven while one side of the connection bracket 410 is fixed to the driving shaft 310 of the motor 300 and the lift bracket 420 is fixed to the other side of the connection bracket 410, the one side of the connection bracket 410 rotates, and thus a height of the other side of the connection bracket 410 varies so that the lift bracket 420 moves upward or downward.

Here, as shown in FIG. 5A, a state in which the connection bracket 410 is disposed lengthwise along a vertical direction is a state in which the lift bracket 420 moves downward. Here, when the lift bracket 420 moves downward as described above, a height of the auxiliary portion 20 becomes relatively increased. That is, while the height of the auxiliary portion 20 becomes higher after using the massage apparatus, the auxiliary portion 20 is allowed to move in a sliding manner above the body portion 10.

On the other hand, as shown in FIG. 5B, a state in which the connection bracket 410 is disposed lengthwise along a lateral direction is a state in which the lift bracket 420 has moved upward. When the lift bracket 420 moves upward as described above, the height of the auxiliary portion 20 is relatively lowered. When the auxiliary portion 20 is moved in a sliding manner to use the massage apparatus, the height of the auxiliary portion 20 is lowered, and thus the body portion 10 and the auxiliary portion 20 may be kept horizontal.

As shown in FIG. 4, the lift bracket 420 may include a guide hole 421 extending along a width direction, and the connection bracket 410 may include a guide bar 411 inserted into the guide hole 421.

As described above, when one side of the connection bracket 410 rotates while being fixed to the driving shaft 310, the other side of the connection bracket 410 draws a circle around the driving shaft 310. The circular movement is movement in which leftward and rightward movement and upward and downward movement occur simultaneously. When the guide hole 421 is formed in the lift bracket 420 and the guide bar 411 inserted into the guide hole 421 is provided in the connection bracket 410, while the other side of the connection bracket 410 moves circularly, the leftward and rightward movement appears as a movement of the guide bar 411 moving leftward and rightward along the guide hole 421 and the upward and downward movement appears as a movement of the lift bracket 420 moving upward and downward.

When the lift bracket 420 is lifted using a method of rotating the connection bracket 410 as described above, the lift bracket 420 may be lifted effectively using only simple components.

To this end, the guide hole 421 extends toward one side in a width direction on the basis of the driving shaft 310, and the motor 300 operates to allow the driving shaft 310 to rotate in one direction and the other direction.

That is, as shown in FIG. 5A, when the connection bracket 410 is disposed vertically, the guide bar 411 is supported while being disposed on the other side of the guide hole 421. When the connection bracket 410 is disposed laterally, the guide bar 411 is supported while being disposed on one side of the guide hole 421. Here, at a point in time when the upward or downward operation of the lift bracket 420 is finished, the guide bar 411 is supported by one side or the other side of the guide hole 421 and thus the upward or downward operation of the lift bracket 420 may be accurately performed.

As shown in FIG. 5A, since the state in which the connection bracket 410 is disposed in the vertical direction is the state in which the auxiliary portion 20 has moved upward as the lift bracket 420 moves downward, the auxiliary portion 20 is disposed above the body portion 10. In this state, since it is necessary that the height of the auxiliary portion 20 is decreased when the auxiliary portion 20 moves in a sliding manner to be withdrawn, as shown in FIG. 5B, the connection bracket 410 rotates to be disposed laterally and thus the lift bracket 420 moves upward. Here, since an initial stage of upward movement of the lift bracket 420 is a point in time when the auxiliary portion 20 starts moving downward, a great deal of load is applied to the motor 300 due to a weight of the auxiliary portion 20. Accordingly, in order to prevent a failure of the motor 300, the lift bracket 420 may be configured to gradually move upward in the initial state. When the connection bracket 410 rotates while the connection bracket 410 is disposed vertically as shown in FIG. 5A, lateral movement is greater than vertical movement, and thus the lift bracket 420 may gradually move upward as described above.

On the other hand, as shown in FIG. 5B, the state in which the connection bracket 410 is disposed laterally is a state in which the auxiliary portion 20 moves downward as the lift bracket 420 moves upward. Here, when the auxiliary portion 20 moves in a sliding manner to be inserted after using the massage apparatus, it is necessary that the height of the auxiliary portion 20 is increased and the auxiliary portion 20 quickly moves upward to a height above the body portion 10 so as to allow the auxiliary portion 20 to smoothly move in a sliding manner above the body portion 10. Accordingly, as shown in FIG. 5B, when the connection bracket 410 rotates while being disposed laterally, the vertical movement is greater than the lateral movement and thus the lift bracket 420 quickly moves downward as described above so that the auxiliary portion 20 may move quickly upward to the height above the body portion 10.

As shown in FIG. 4, the wheel bracket assembly 400 further includes the support bracket 430 to which the motor 300 is fixed. Pairs of support plates 422 and 431 which face each other are provided on the support bracket 430 and the lift bracket 420 while inner circumferential surfaces of one pair of support plates 422 press against and support outer circumferential surfaces of the other pair of support plates 431 so that the lift bracket 420 may stably move upward or downward even when the load of the auxiliary portion 20 is applied.

A first slide guide 424 extending upward or downward is formed at the lift bracket 420 and a first fastening hole 433 through which the first slide guide 424 passes and is supported is formed in the support bracket 430 so that the lift bracket 420 may stably move upward or downward.

Figure 6A:
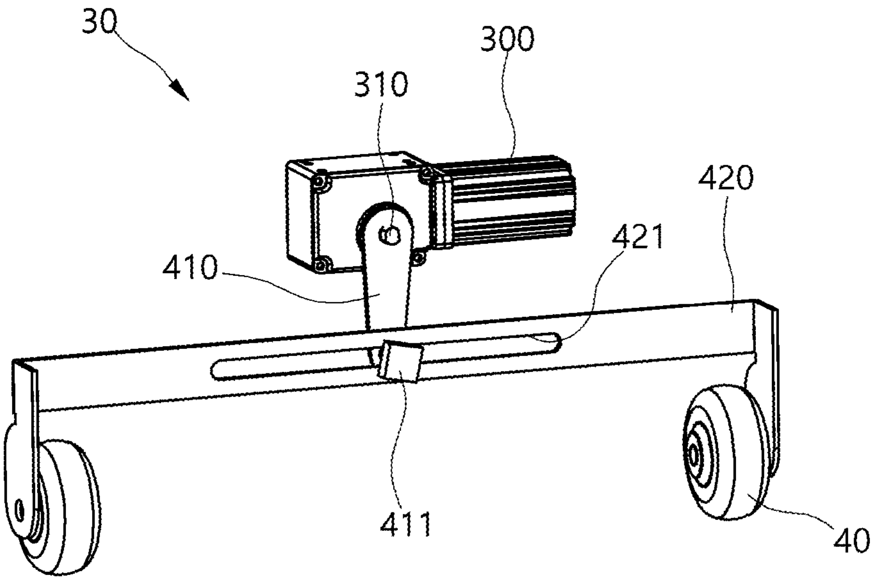
Figure 6B:
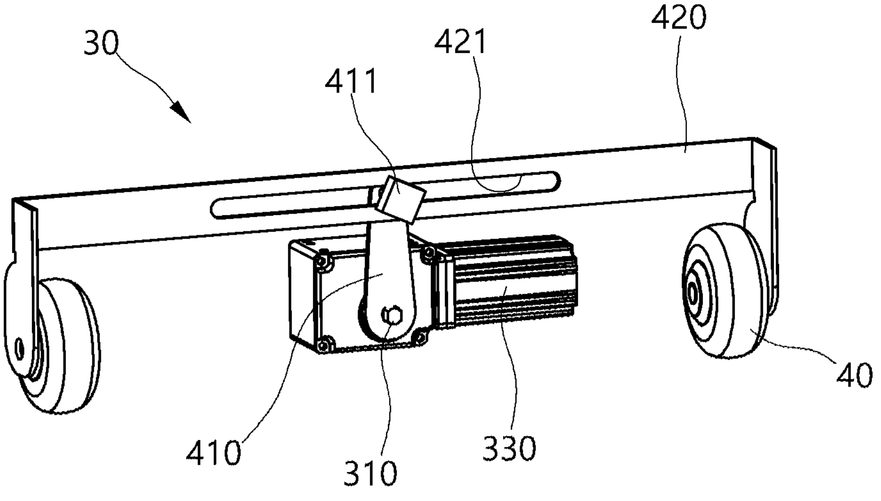

FIGS. 6A and 6B are perspective views illustrating a lifting member according to a third embodiment of the present disclosure, wherein FIG. 6A is a view illustrating a state in which a height of the auxiliary portion becomes higher to store the massage apparatus, and FIG. 6B is a view illustrating a state in which the height of the auxiliary portion becomes lower to use the massage apparatus.

As shown in FIGS. 6A and 6B, the guide hole 421 may extend both ways in a width direction on the basis of the driving shaft 310, and the motor 300 may operate so that the driving shaft 310 rotates only in one direction.

That is, when the connection bracket 410 rotates while one side thereof is fixed to the driving shaft 310, the other side of the connection bracket 410 draws a circle around the driving shaft 310. Such a circular movement includes lateral movement and vertical movement which occur simultaneously. When the guide hole 421 is formed in the lift bracket 420 and the guide bar 411 inserted into the guide hole 421 is provided in the connection bracket 410, while the other side of the connection bracket 410 moves circularly, the lateral movement is shown as movement of the guide bar 411 laterally moving along the guide hole 421 and the vertical movement is shown as movement of the lift bracket 420 being lifted so that the lift bracket 420 may be lifted effectively only with simple components.

Since the guide hole 421 is formed to extend both ways in a width direction of the driving shaft 310, a unidirectional rotating motor in which the driving shaft 310 rotates only in one direction is used as the motor 300 so as to control an upward or downward movement height of the lift bracket 420. Generally, since the unidirectional rotating motor is less expensive in comparison to a bidirectional rotating motor, when configured as described above, a cost may be reduced.

Here, as shown in FIGS. 6A and 6B, it may be configured that downward movement or upward movement of the lift bracket 420 is finished while the connection bracket 410 is disposed perpendicularly in a vertical direction. This is to secure structural stability by configuring the massage apparatus so that a load of a user is applied perpendicularly to the driving shaft 310 of the motor while the massage apparatus is in use.

Figure 7A:
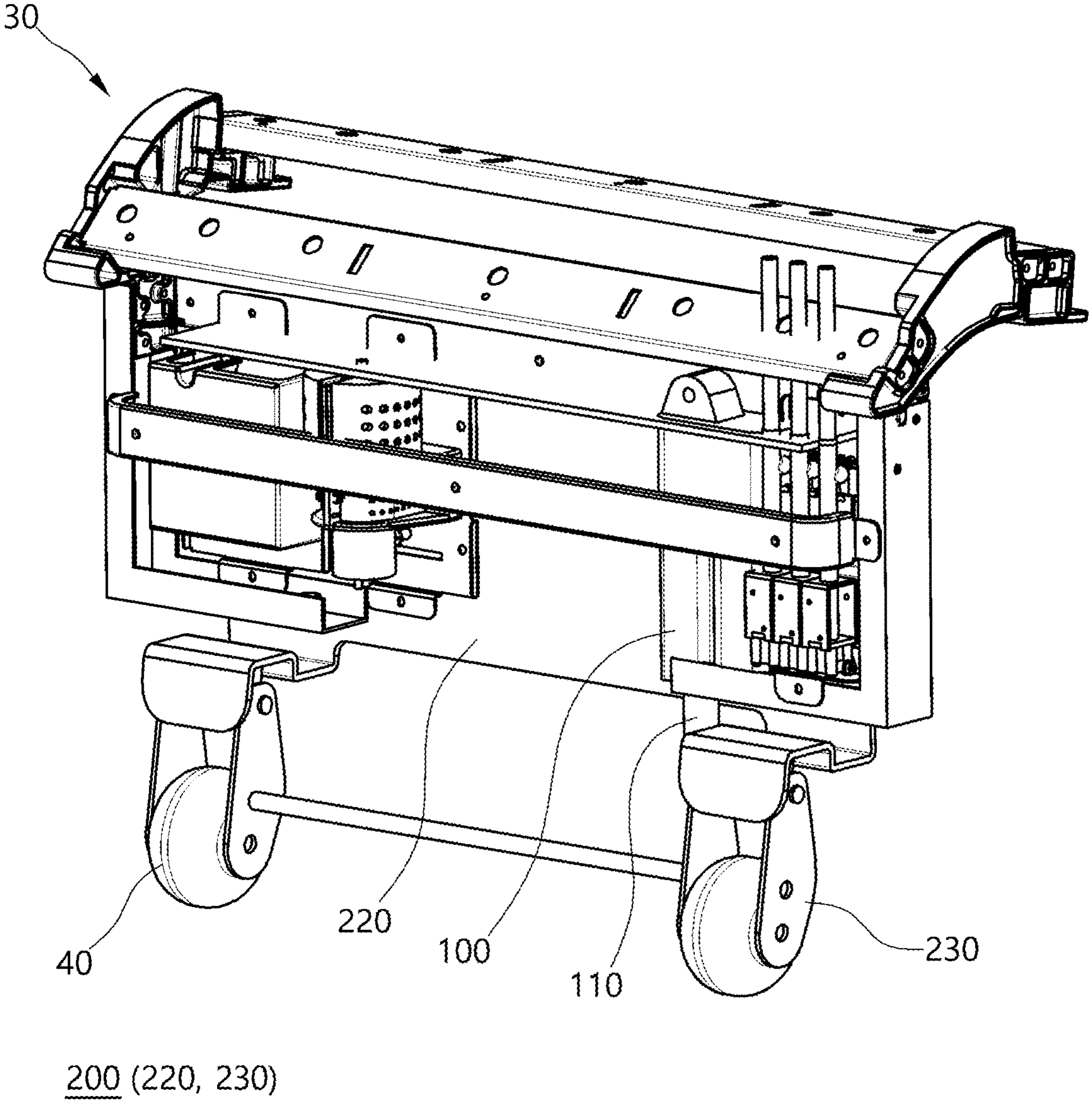
Figure 7B:
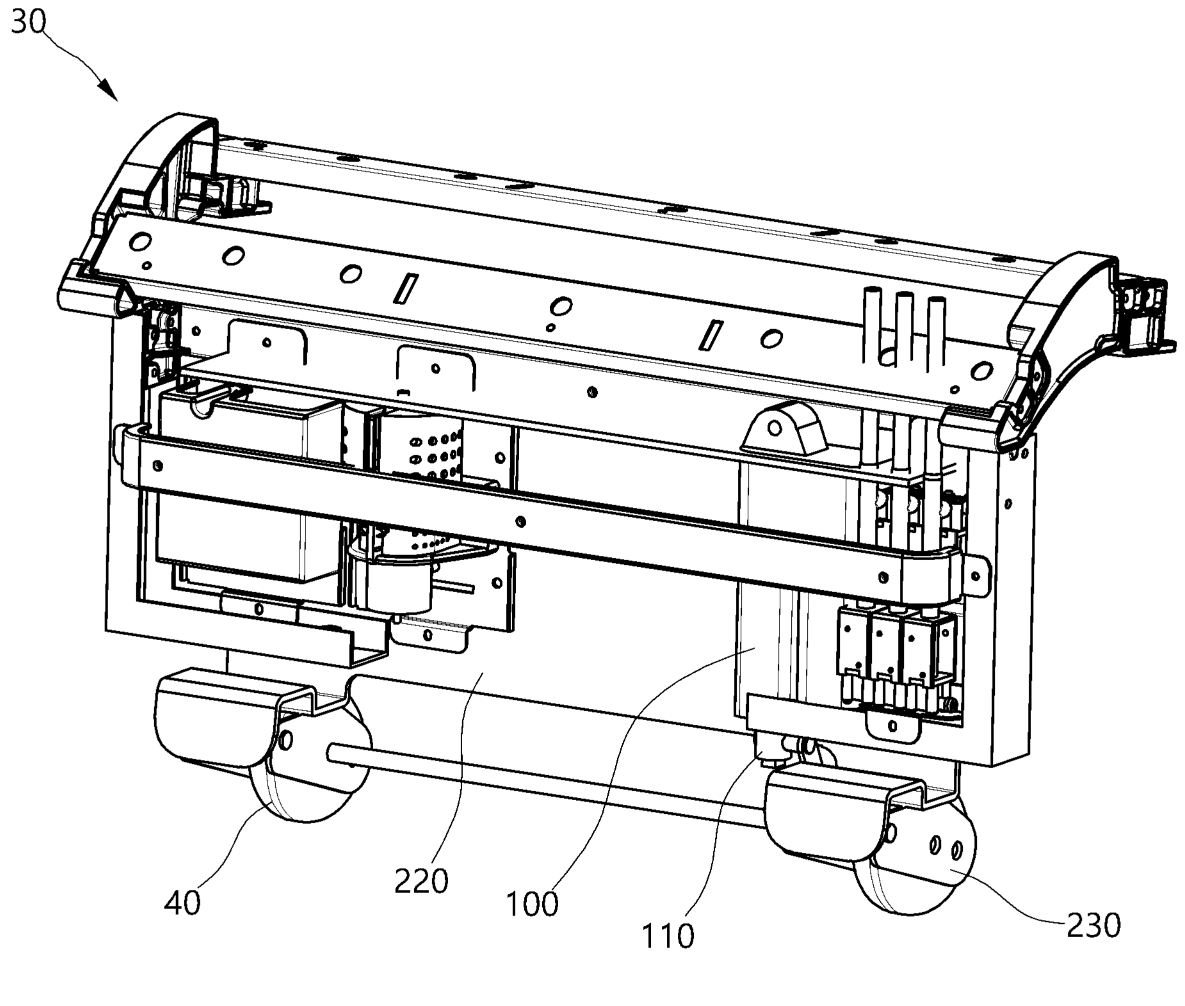
Figure 8A:
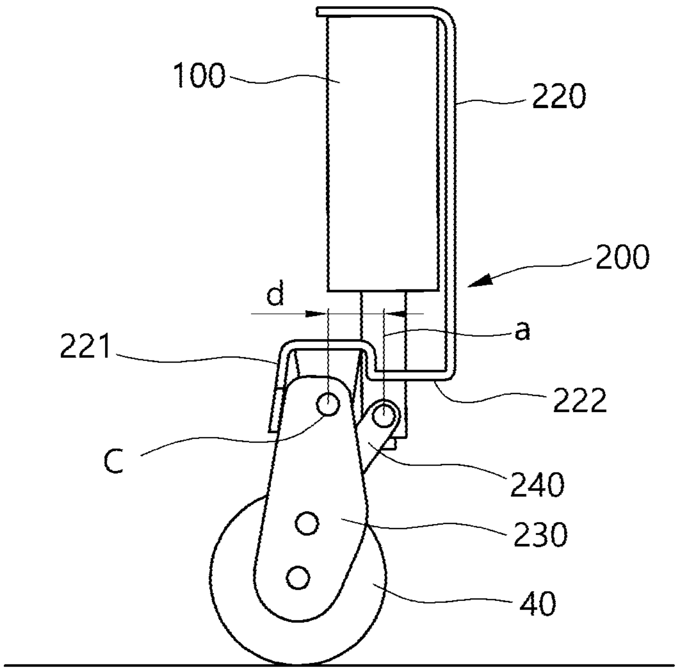
Figure 8B:
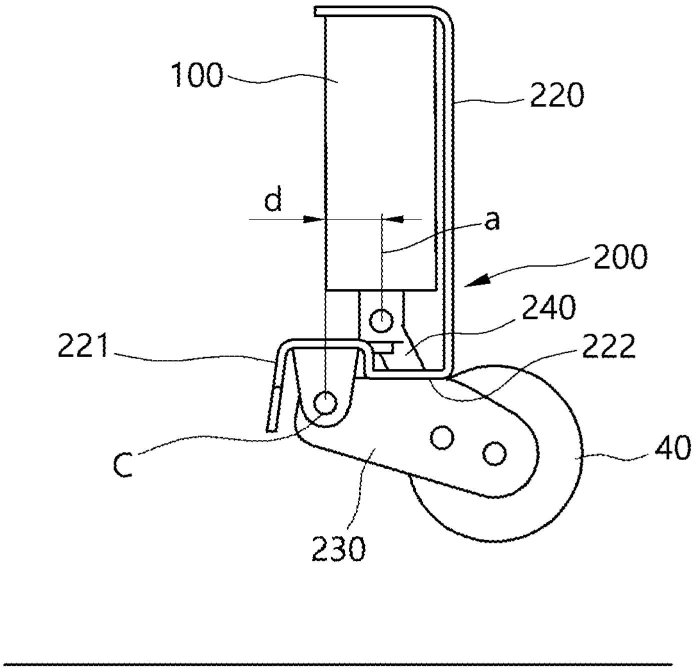

FIGS. 7A, 7B, 8A and 8B are views illustrating a lifting member according to a fourth embodiment of the present disclosure, wherein FIG. 7A is a perspective view illustrating a state in which a height of the auxiliary portion becomes higher to store the massage apparatus, FIG. 7B is a perspective view illustrating a state in which the height of the auxiliary portion becomes lower to use the massage apparatus, FIG. 8A is a side view illustrating the state in which the height of the auxiliary portion becomes higher to store the massage apparatus, and FIG. 8B is a side view illustrating the state in which the height of the auxiliary portion becomes lower to use the massage apparatus.

As shown in FIGS. 7A and 7B, a wheel bracket assembly 200 may include a support bracket 220 to which a cylinder 100 is fixed and a rotating bracket 230 having one side hinge-fixed to the support bracket 220 and the other side to which the wheel 40 is rotatably fixed so as to adjust a height of the wheel 40 while rotating according to an operation of the cylinder 100.

That is, as shown in FIGS. 7A and 7B, since the one side of the rotating bracket 230 is hinge-fixed to the support bracket 220 and the cylinder 100 is connected to the other side of the rotating bracket 230, the other side of the rotating bracket 230 rotates around the hinge-fixed one side according to the operation of the cylinder 100.

As shown in FIG. 8A, when the rotating bracket 230 rotates in one direction and thus the other side of the rotating bracket 230 moves downward, a height of the auxiliary portion 20 becomes relatively high, and thus the user may move in, a sliding manner, the auxiliary portion 20 above the body portion 10 while the height of the auxiliary portion 20 is increased after using the massage apparatus. As shown in FIG. 8B, when the rotating bracket 230 rotates in another direction and thus the other side of the rotating bracket 230 moves upward, the height of the auxiliary portion 20 becomes relatively low. When the user moves the auxiliary portion 20 in a sliding manner to use the massage apparatus, the height of the auxiliary portion 20 becomes lower so that the body portion 10 and the auxiliary portion 20 are kept horizontal.

Here, as shown in FIGS. 8A and 8B, the wheel bracket assembly 200 may further include a connection bracket 240 configured to connect a driving shaft 110 to the rotating bracket 230 to space an extension line a of the driving shaft 110 at a certain distance d apart from a rotational center c of the rotating bracket 230.

The auxiliary portion 20 includes an auxiliary plate configured to come into direct contact with and support a lower body of the user and an auxiliary leg disposed perpendicularly to the ground to be kept horizontal with the body portion 10 while the auxiliary plate is spaced at a certain distance apart from the ground. The above cylinder 100 is installed on the auxiliary leg disposed perpendicularly to the ground in consideration of an operational direction of the driving shaft 110. When the cylinder 100 is installed on the auxiliary leg of the auxiliary portion 20 as described above, it is easy to secure a space below the auxiliary plate so that an overall volume of the massage apparatus is reduced and becomes compact overall even when the auxiliary portion 20 is disposed above the body portion 10.

However, in order to rotate the rotating bracket 230 using the driving shaft 110 of the cylinder 100 disposed as described above, the other side of the rotating bracket 230 is rotated using the connection bracket 240 while the extension line a of the driving shaft 110 and the rotational center c of the rotating bracket 230 are spaced apart as described above.

Here, as shown in FIGS. 8A and 8B, a first support surface 221 and a second support surface 222 which prevent the rotating bracket 230 from rotating more than a certain angle may be formed on the support bracket 220.

That is, as shown in FIG. 8A, when the driving shaft 110 of the cylinder 100 moves downward and the rotating bracket 230 rotates in one direction, the other side of the rotating bracket 230 moves downward and the height of the auxiliary portion 20 becomes higher. In this state, when a weight of the user is applied, the weight is applied to the cylinder 100. Accordingly, durability of the cylinder 100 may be degraded. However, the first support surface 221 configured to support the rotating bracket 230 not to rotate further when the rotating bracket 230 rotates in one direction and thus upward movement of the auxiliary portion 20 is finished is formed so as to perform structurally stable support even when the weight of the user is applied. In addition, as shown in FIG. 8B, when the rotating bracket 230 rotates in the other direction and thus downward movement of the auxiliary portion 20 is finished, the second support surface 222 configured to support the rotating bracket 230 not to further rotate is formed so as to perform structurally stable support even when the weight of the user is applied.

Figure 9:
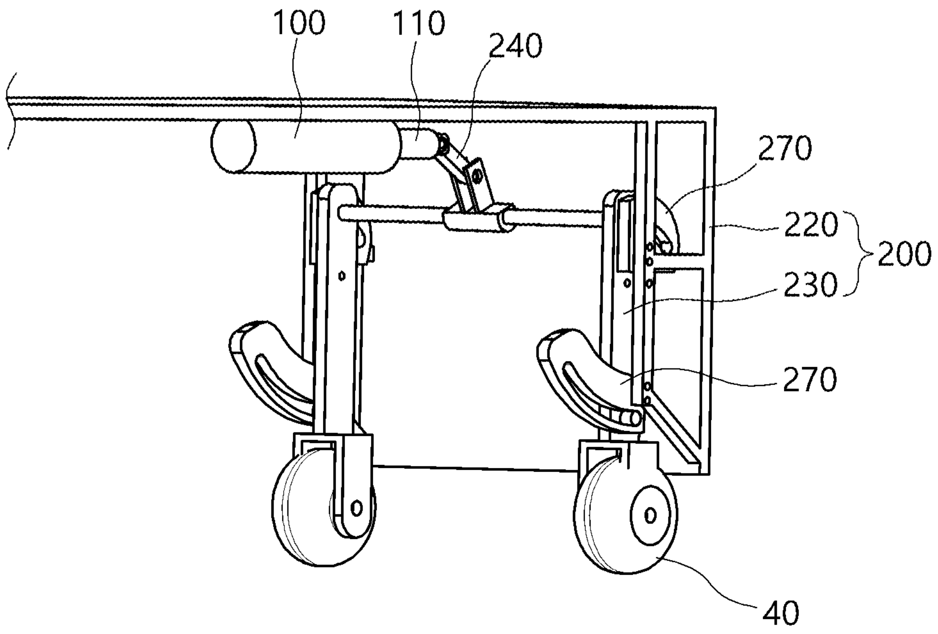
Figure 10A:
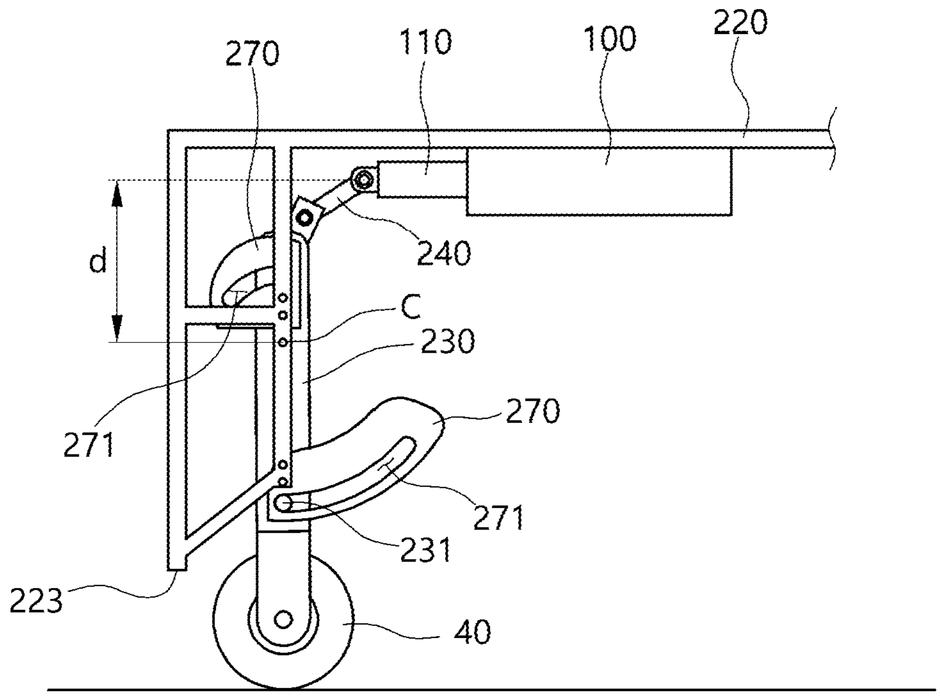
Figure 10B:
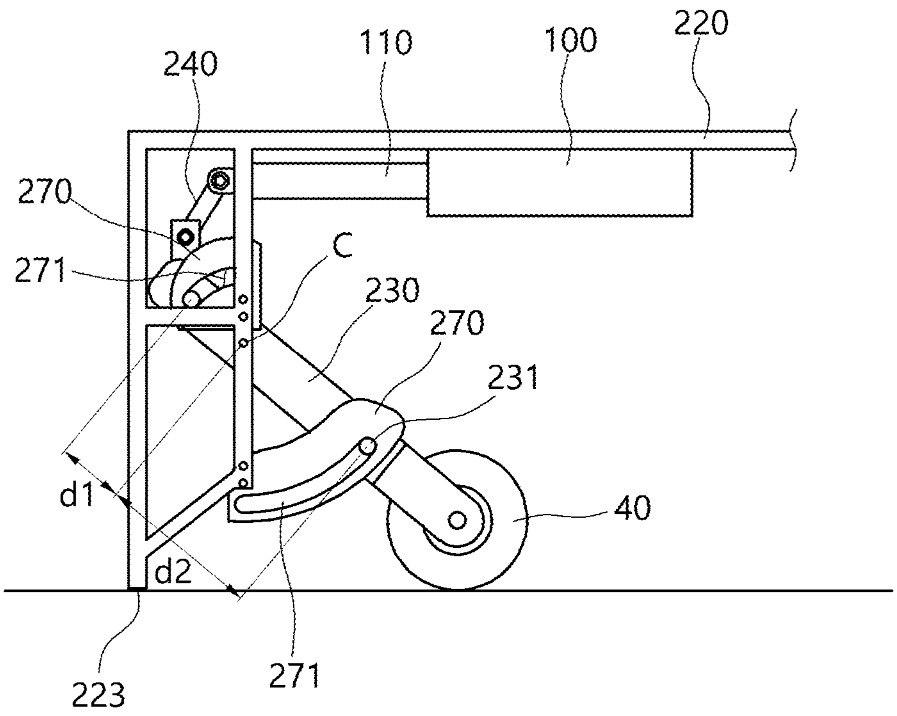

FIGS. 9, 10A and 10B are views illustrating a lifting member according to a fifth embodiment of the present disclosure, wherein FIG. 9 is a perspective view illustrating the auxiliary portion from inside, FIG. 10A is a side view illustrating a state in which a height of the auxiliary portion becomes higher to store the massage apparatus, and FIG. 10B is a side view illustrating a state in which the height of the auxiliary portion becomes lower to use the massage apparatus.

As shown in FIG. 9, the support bracket 220 may include a guide bracket 270 including a guide hole 271 formed to provide a movement path of the rotating bracket 230, and the rotating bracket 230 may include a guide bar 231 inserted into the guide hole 271.

That is, as shown in FIG. 9, while a central portion of the rotating bracket 230 is hinge-fixed to the support bracket 220, the driving shaft 110 of the cylinder 100 is fixed to one side of the rotating bracket 230 and the other side of the rotating bracket 230 is configured to rotate according to the operation of the cylinder 100. As shown in FIG. 10A, the driving shaft 110 and the rotational center c of the rotating bracket 230 are spaced at the certain distance d apart from each other, and the connection bracket 240 configured to connect the driving shaft 110 to the rotating bracket 230 may be further included.

The cylinder 100 is installed on a lower surface of the auxiliary plate configured to come into direct contact with and support the lower body of the user to allow the driving shaft 110 of the cylinder 100 to be parallel to a sliding direction of the auxiliary portion 20. Here, the cylinder 100 may be installed to be pressed against a bottom of the auxiliary plate to easily secure a space below the auxiliary plate.

As shown in FIG. 10B, when the rotating bracket 230 rotates in one direction according to an operation of the cylinder installed as described above and thus the other side of the rotating bracket 230 moves downward, a height of the auxiliary portion 20 becomes relatively high, and thus the user may move, in a sliding manner, the auxiliary portion 20 above the body portion 10 while the height of the auxiliary portion 20 is increased after using the massage apparatus. As shown in FIG. 10B, when the rotating bracket 230 rotates in another direction and thus the other side of the rotating bracket 230 moves upward, the height of the auxiliary portion 20 becomes relatively low. When the user moves the auxiliary portion 20 in a sliding manner to use the massage apparatus, the height of the auxiliary portion 20 becomes lower so that the body portion 10 and the auxiliary portion 20 are kept horizontal.

Here, as described above, when the support bracket 220 includes the guide bracket 270 including the guide hole 271 formed to allow the guide bar 231 provided in the rotating bracket 230 to be inserted therein, the rotating bracket 230 may rotate stably.

The guide brackets 270 may be provided above and below on the basis of the rotational center of the rotating bracket 230 so as to further improve structural stability.

Here, as shown in FIGS. 10A and 10B, the guide bracket 270 provided above and the guide bracket 270 provide below may be disposed at different distances from the rotational center c of the rotating bracket 230.

When a distance d1 between the guide bracket 270 provided above and the rotational center c is formed to differ from a distance d2 between the guide bracket 270 provided below and the rotational center c, a rotational radius of one side of the rotating bracket 230 may differ from a rotational radius of the other side of the rotating bracket 230.

Here, as shown in FIGS. 10A and 10B, the guide bracket 270 provided above may be disposed to be relatively closer to the rotational center c of the rotating bracket 230 than the guide bracket 270 provide below. That is, the distance d1 between the guide bracket 270 provided above and the rotational center c is formed to be shorter than the distance d2 between the guide bracket 270 provided below and the rotational center c. When configured as described above, although the driving shaft 110 of the cylinder 100 moves a short distance, the other side of the rotating bracket 230 may move a relatively long distance so that the auxiliary portion 20 may quickly move upward or downward.

As shown in FIGS. 10A and 10B, the support bracket 220 may include a buffer end 223 coming into contact with the ground when the wheel 40 is located at an uppermost point.

That is, when the rotating bracket 230 rotates in one direction and thus the auxiliary portion 20 moves upward and upward movement of the auxiliary portion 20 is finished, as shown in FIG. 10A, the wheel 40 supports a load applied to the auxiliary portion 20. Here, since a direction in which the load is applied is disposed to be collinear with an extension line connecting the rotational center c and the wheel 40, stable support is possible even when the load is applied.

However, when the rotating bracket 230 rotates in the other direction and thus the auxiliary portion 20 moves downward and downward movement of the auxiliary portion 20 is finished, as shown in FIG. 10B, a direction in which a load is applied is disposed to be tilted from an extension line connecting the rotational center c and the wheel 40. With this disposition state, it is difficult to effectively support the applied load. However, as described above, the buffer end 223 coming into contact with the ground when the downward movement of the auxiliary portion 20 is finished and thus the wheel 40 is located at the uppermost point may be formed on the support bracket 220 so as to perform stable support even when the load is applied.

Figure 11A:
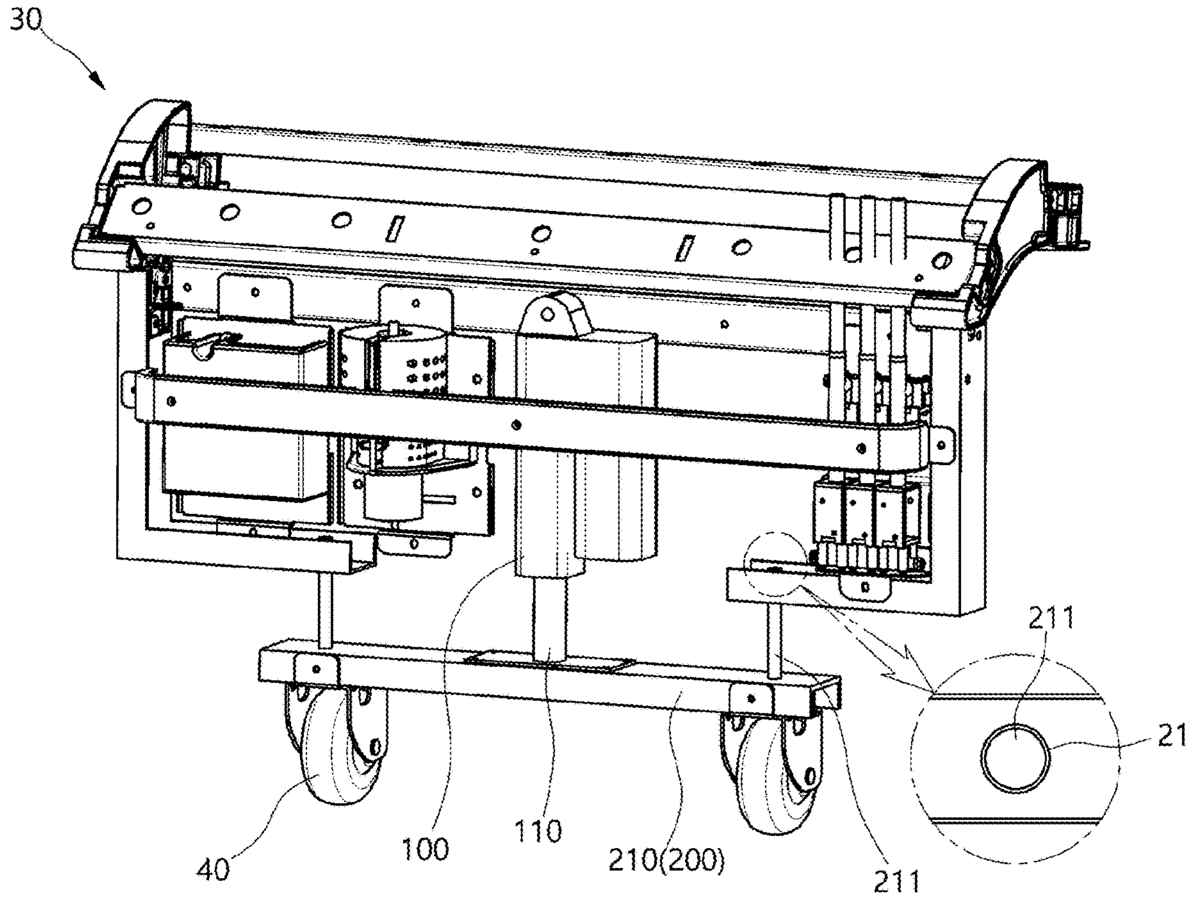
Figure 11B:
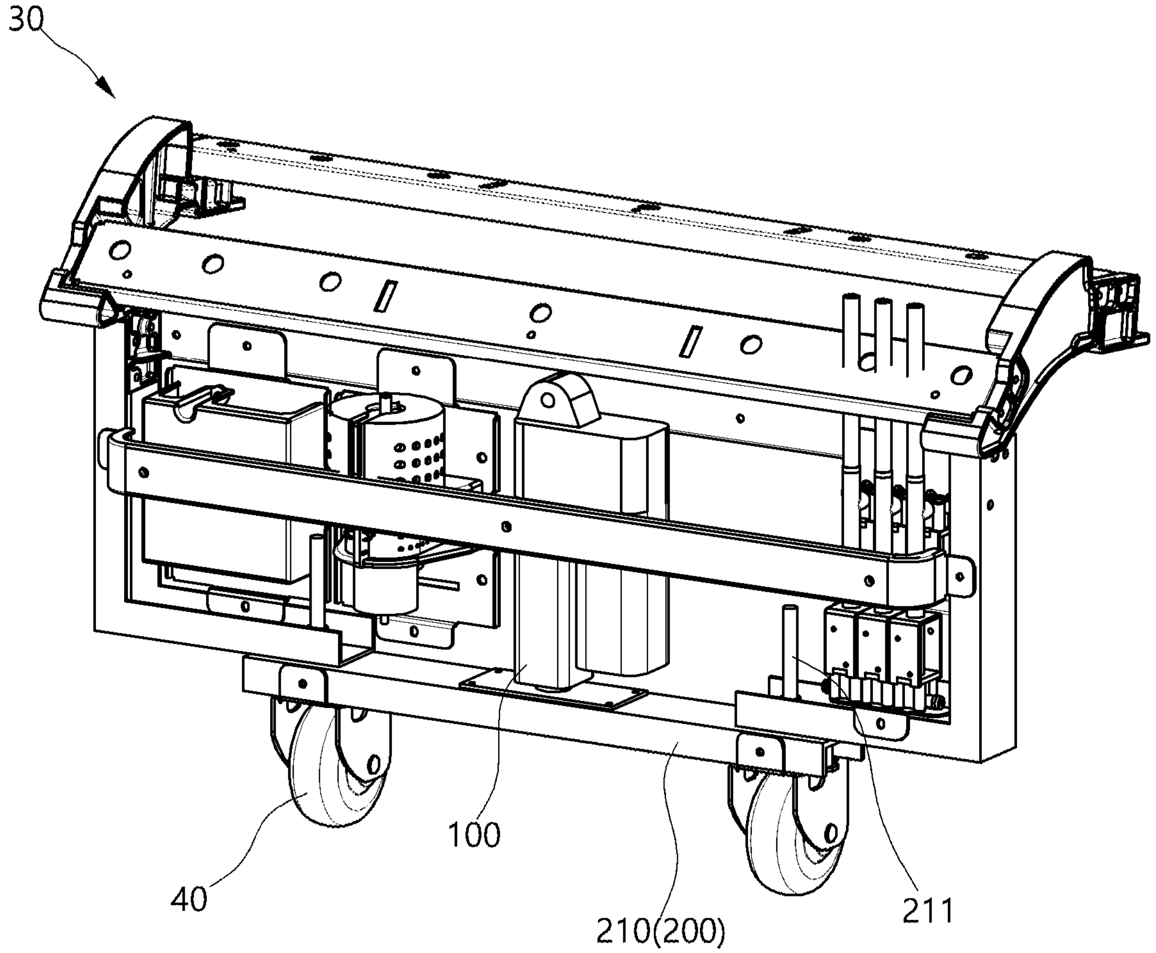

FIGS. 11A and 11B are perspective views illustrating a lifting member according to a sixth embodiment of the present disclosure, wherein FIG. 11A is a view illustrating a state in which a height of the auxiliary portion becomes higher to store the apparatus, and FIG. 11B is a view illustrating a state in which the height of the auxiliary portion becomes lower to use the massage apparatus.

As shown in FIGS. 11A and 11B, the lifting member 30 may include the cylinder 100 including the driving shaft 110 and the wheel bracket assembly 200 connected to the driving shaft 110 and adjusted in height.

That is, when the wheel bracket assembly 200 is connected to the driving shaft 110 of the cylinder 100 and the cylinder 100 is driven, the driving shaft 110 moves in an axial direction so that the wheel bracket assembly 200 varies in height and moves upward or downward.

The wheel bracket assembly 200 may include a lift bracket 210 directly connected to the driving shaft 110 and adjusted in height. When the driving shaft 110 moves in the axial direction, the lift bracket 210 moves upward or downward and varies in height.

That is, as shown in FIG. 11A, when the lift bracket 210 moves downward, a height of the auxiliary portion 20 becomes relatively high. Accordingly, the user may move in a sliding manner the auxiliary portion 20 above the body portion 10 while the height of the auxiliary portion 20 becomes higher after using the massage apparatus. On the other hand, as shown in FIG. 11B, when the lift bracket 210 moves upward, the height of the auxiliary portion 20 becomes relatively low. When the user moves the auxiliary portion 20 in a sliding manner to use the massage apparatus, the height of the auxiliary portion 20 becomes lower so that the body portion 10 and the auxiliary portion 20 may be kept horizontal.

Here, as shown in FIG. 11A, a guide 211 extending along a height direction may be formed in the lift bracket 210, and the guide hole 271 through which the guide 211 passes to be supported may be formed in the auxiliary portion 20.

When the guide 211 provided in the lift bracket 210 is configured to pass through the guide hole 271 formed in the auxiliary portion 20 as described above, while the lift bracket 210 moves upward or downward, the guide 211 is supported by the guide hole 271 so that the lift bracket 210 may stably move upward or downward.

Further, a plurality of such guides 211 may be provided on each of one side and the other side of the lift bracket 210 and thus the one side and the other side of the lift bracket 210 are configured to be supported using the guides 211 so that the lift bracket 210 may move upward or downward more stably.

Figure 12A:
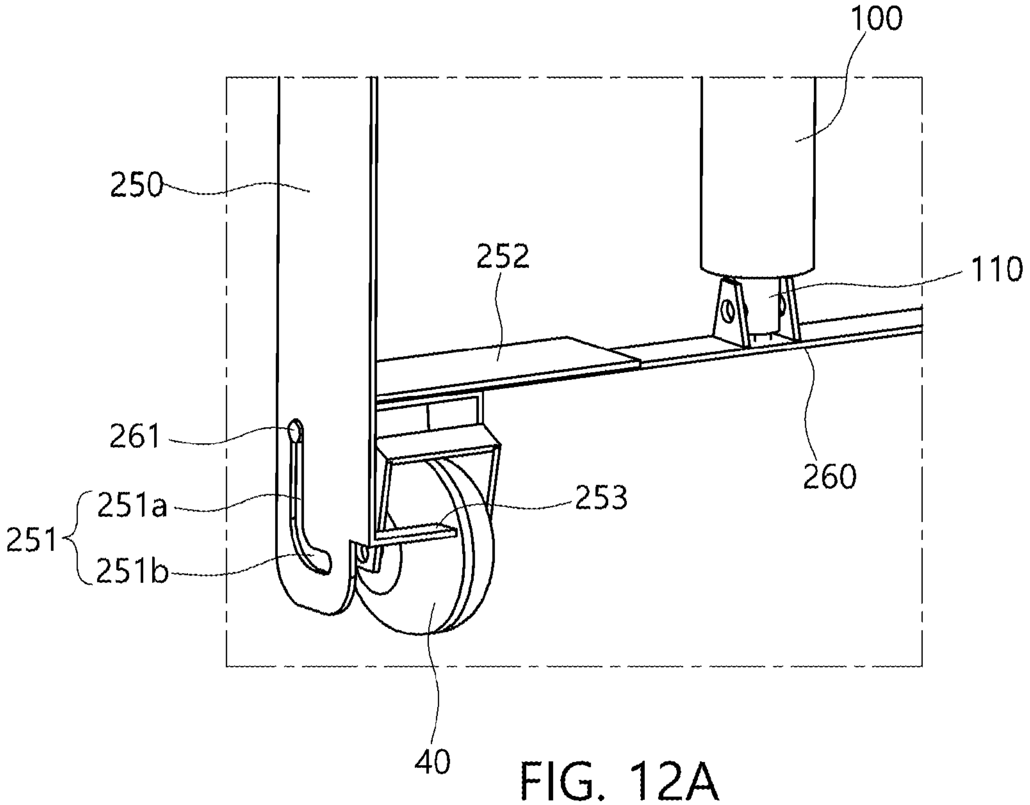
Figure 12B:
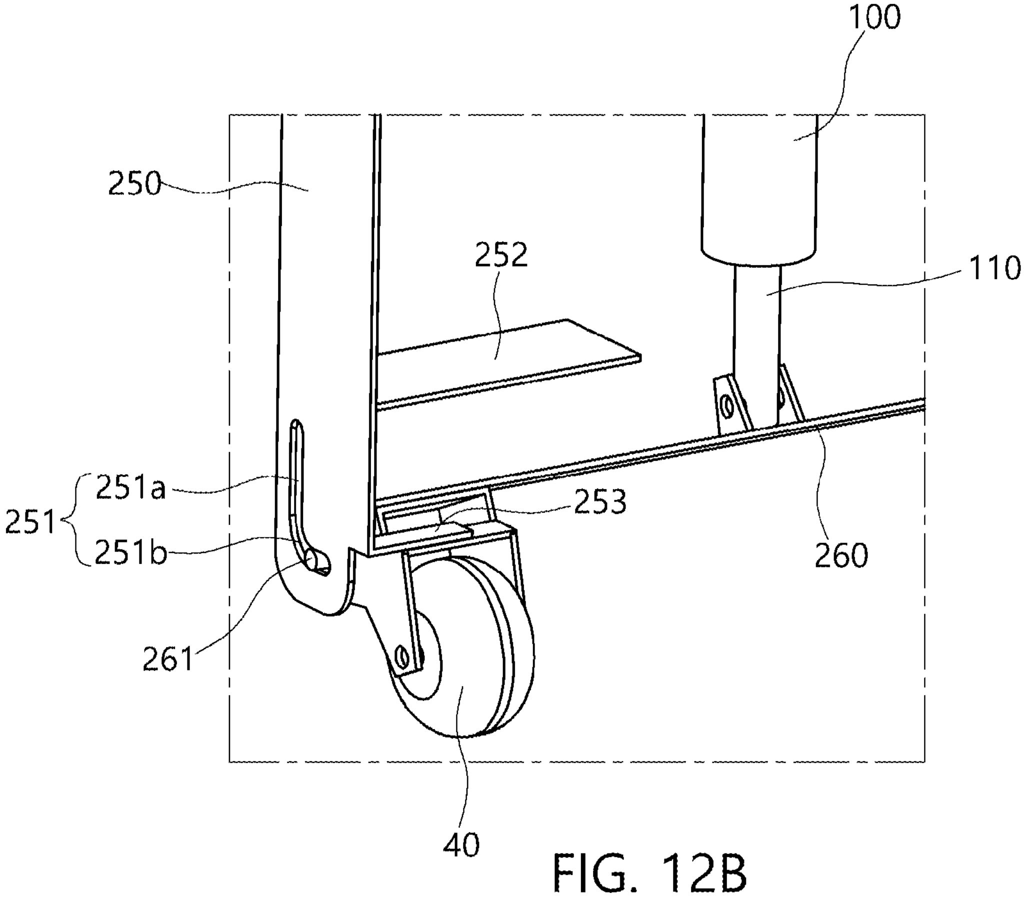

FIGS. 12A and 12B are views illustrating a lifting member according to a seventh embodiment of the present disclosure, wherein FIG. 12A is a perspective view illustrating a state in which a height of the auxiliary portion becomes lower to use the massage apparatus, and FIG. 12B is a perspective view illustrating a state in which the height of the auxiliary portion becomes higher to store the massage apparatus.

As shown in FIGS. 12A and 12B, the wheel bracket assembly 200 may include a support bracket 250 to which the cylinder 100 is fixed and a rotating bracket 260 having one side hinge-fixed to the driving shaft 110 and the other side to which the wheel 40 is rotatably fixed so as to adjust a height of the wheel 40 while rotating according to an operation of the cylinder 100.

That is, when the driving shaft 110 moves upward while the cylinder 100 is vertically fixed to the support bracket 250, the rotating bracket 260 moves upward and the height of the auxiliary portion 20 becomes relatively low. When the driving shaft 110 moves downward, the rotating bracket 260 moves downward and thus the height of the auxiliary portion 20 becomes relatively high. Here, the rotating bracket 260 is hinge-fixed to the driving shaft 110 to rotate while moving upward or downward.

Here, the support bracket 250 may include a guide hole 251 configured to provide a movement path of the rotating bracket 260 and the rotating bracket 260 may include a guide bar 261 inserted into the guide hole 251.

When the guide bar 261 provided in the rotating bracket 260 is configured to be inserted into the guide hole 251 formed in the support bracket 250 as described above, while the rotating bracket 260 moves upward or downward, the guide bar 261 is supported by the guide hole 251 so that the rotating bracket 260 may stably move upward or downward.

As shown in FIGS. 12A and 12B, the guide hole 251 may include a lift part 251*a* extending along a height direction and a height fixing part 251*b* configured to support the rotating bracket 260 to fix a height while having rotated by a certain angle.

That is, as shown in FIG. 12A, the lift part 251*a* is configured to extend vertically so that the guide bar 261 moves upward or downward along the lift part 251*a*. When the guide bar 261 moves to an upper end of the lift part 251*a*, upward movement of the rotating bracket 260 is finished.

In addition, as shown in FIG. 12B, the height fixing part 251*b* is formed to extend from a lower end of the lift part 251*a*. As the guide bar 261 moves to the lower end of the lift part 251*a*, the rotating bracket 260 moves downward and then moves along the height fixing part 251*b* extending from the lift part 251*a*. When the guide bar 261 moves to the other end of the height fixing part 251*b*, a height of the rotating bracket 260 is fixed, and thus upward movement of the auxiliary portion 20 is finished. The height fixing part 251*b* needs to support the height of the rotating bracket 260 not to change even when a load is vertically applied to the auxiliary portion 20. To this end, the height fixing part 251*b* may be formed to allow the guide bar 261 to be horizontally movable by a certain distance. That is, the lift part 251*a* is formed to extend in a vertical direction of the auxiliary portion 20 to allow the guide bar 261 to move upward or downward and the height fixing part 251*b* is formed to extend in a front-rear direction of the auxiliary portion 20 to allow the guide bar 261 to be horizontally movable by a certain distance. A part where the lift part 251*a* and the height fixing part 251*b* are connected to each other to allow the guide bar 261 to be smoothly movable thereover may be formed to have a curved shape.

The support bracket 250 may include a first support surface 252 configured to prevent the rotating bracket 260 from moving upward to a certain height or higher as shown in FIG. 12A and a second support surface 253 configured to prevent the rotating bracket 260 from rotating by a certain angle or more as shown in FIG. 12B.

That is, when the guide bar 261 moves upward along the lift part 251*a*, the rotating bracket 260 moves upward. Here, the first support surface 252 is formed at a position where the upward movement of the rotating bracket 260 is finished so as to support the rotating bracket 260 not to move further upward and not to allow the height of the rotating bracket 260 to vary even when the load is applied to the auxiliary portion 20.

In addition, when the guide bar 261 moves downward along the lift part 251*a* and thus the rotating bracket 260 moves downward and then the guide bar 261 moves horizontally by a certain distance along the height fixing part 251*b*, a height of the rotating bracket 260 is fixed in a state of having moved downward. When the second support surface 253 is formed at a position where the downward movement of the rotating bracket 260 is finished, the rotating bracket 260 may be supported not to move further downward while simultaneously being supported not to allow the height of the rotating bracket 260 to vary even when the load is applied to the auxiliary portion 20.

Figure 13A:
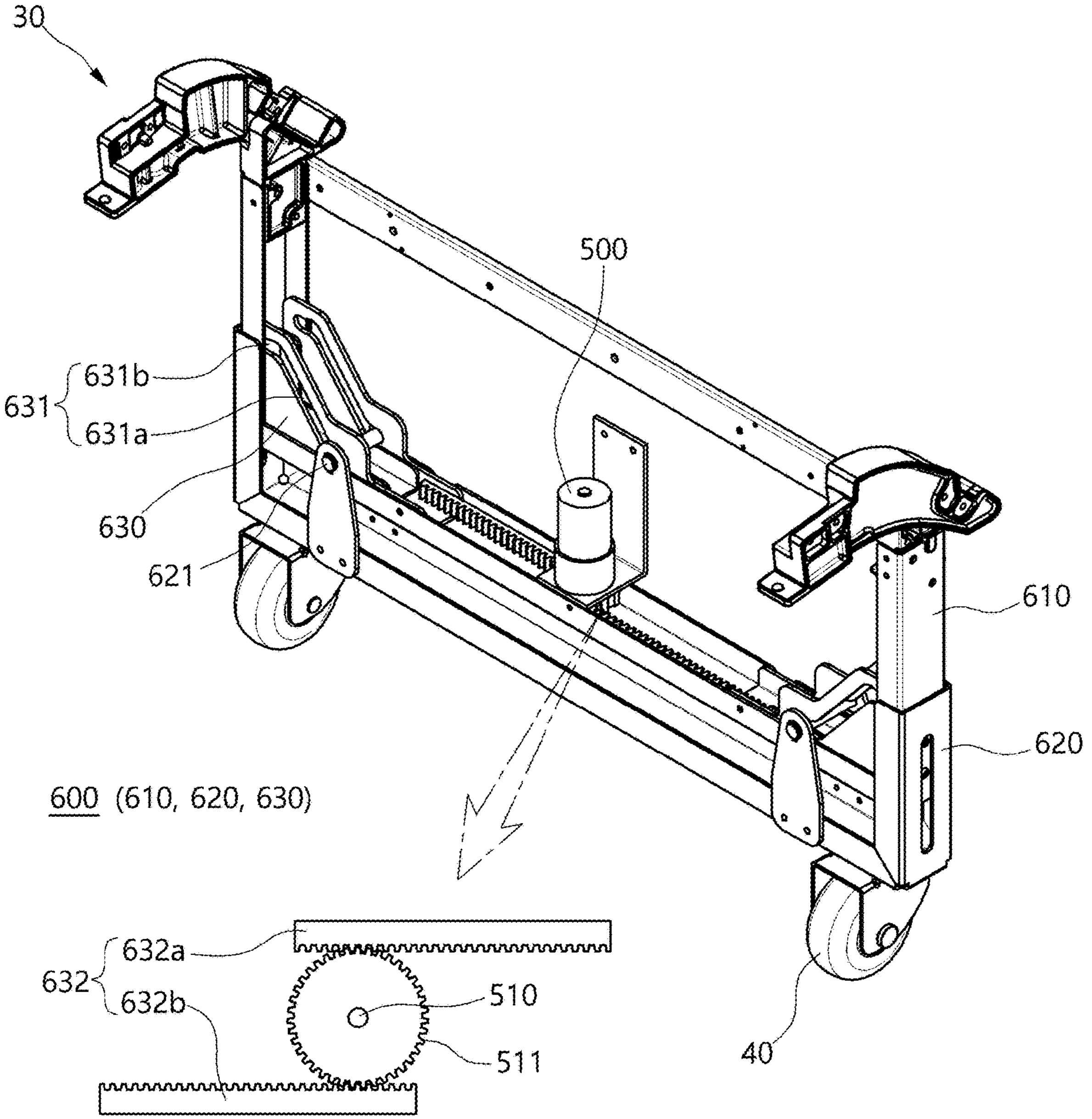
Figure 13B:
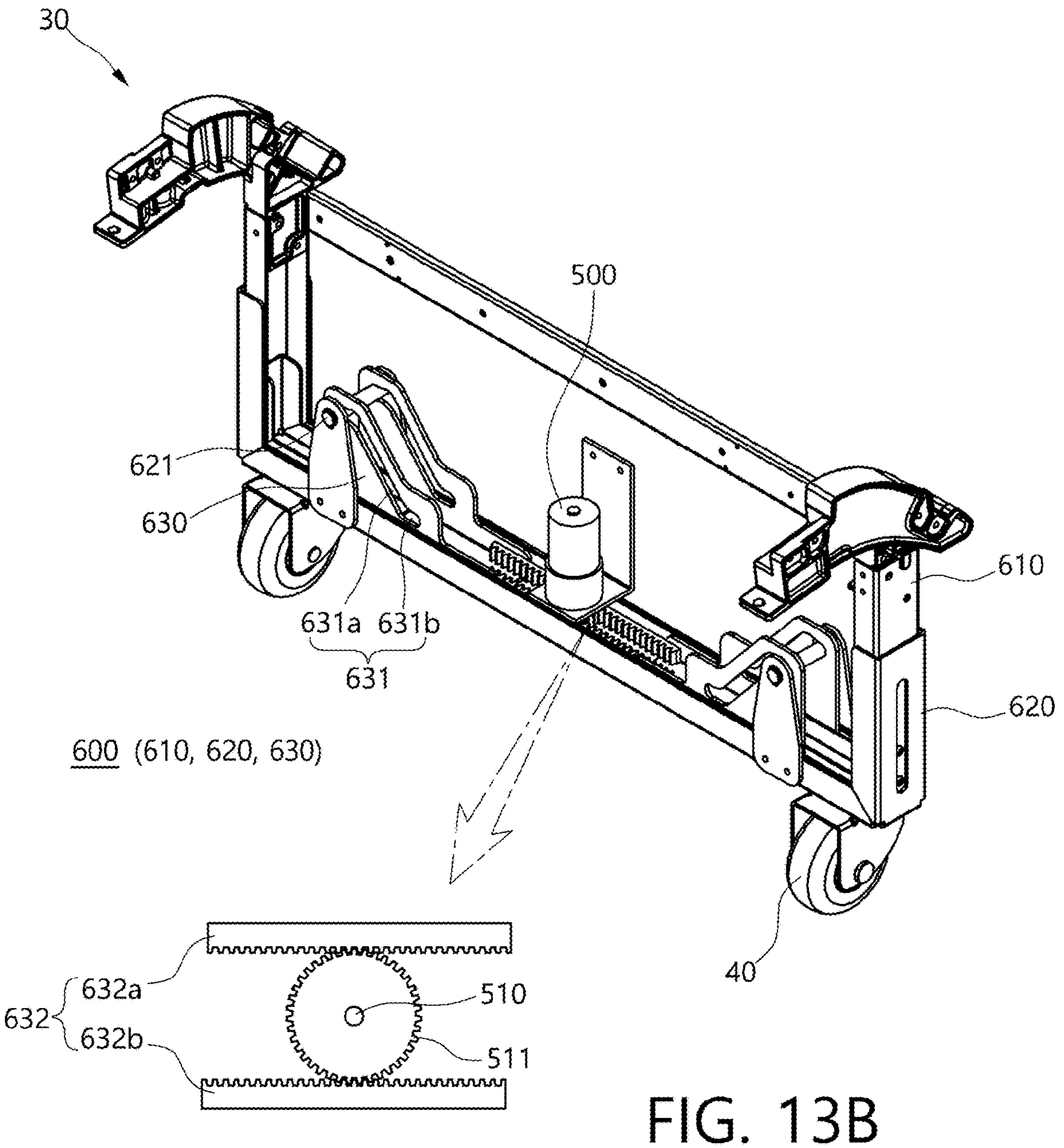

FIGS. 13A and 13B are views illustrating a lifting member according to an eighth embodiment of the present disclosure, wherein FIG. 13A is a perspective view illustrating a state in which a height of the auxiliary portion becomes higher to store the massage apparatus, and FIG. 13B is a perspective view illustrating a state in which the height of the auxiliary portion becomes lower to use the massage apparatus.

As shown in FIGS. 13A and 13B, the lifting member 30 includes a motor 500 including a driving shaft 510 and a wheel bracket assembly 600 connected to the driving shaft 510 and adjusted in height. Here, the wheel bracket assembly 600 may include a support bracket 610 to which the motor 500 is fixed, a lift bracket 620 adjusted in height according to an operation of the motor 500, and a guide bracket 630 configured to guide the lift bracket 620 to be adjusted in height.

That is, while the motor 500 is fixed to and supported by the support bracket 610, the wheel bracket assembly 600 is connected to the driving shaft 510 of the motor 500 so as to adjust a height of the auxiliary portion 20.

Here, since the driving shaft 510 of the motor 500 is disposed in a vertical direction of the auxiliary portion 20, when the driving shaft 510 rotates in this state, a driving force is applied in a lateral direction or a front-rear direction of the auxiliary portion 20. Accordingly, it is necessary to move the auxiliary portion 20 upward or downward in the vertical direction using the driving force applied in the above direction. The guide bracket 630 is configured to change a direction of applying the driving force to allow the driving force applied in the lateral direction or the front-rear direction to be applied in the vertical direction so as to allow the lift bracket 620 to move upward or downward.

That is, as shown in FIG. 13A, when the lift bracket 620 moves downward, a height of the auxiliary portion 20 becomes relatively high. Accordingly, the auxiliary portion 20 is allowed to move in a sliding manner above the body portion 10 while the height of the auxiliary portion 20 becomes higher after using the massage apparatus.

On the other hand, as shown in FIG. 13B, when the lift bracket 620 moves upward, the height of the auxiliary portion 20 becomes relatively low. When the auxiliary portion 20 is moved in a sliding manner to use the massage apparatus, the height of the auxiliary portion 20 becomes lower so that the body portion 10 and the auxiliary portion 20 may be kept horizontal.

As shown in FIGS. 13A and 13B, the guide bracket 630 may include a guide hole 631 configured to provide a movement path of the lift bracket 620, and the lift bracket 620 may include a guide bar 621 inserted into the guide hole 631.

When the guide bar 621 provided in the lift bracket 620 is configured to be inserted into the guide hole 631 formed in the guide bracket 630 as described above, while the lift bracket 620 moves upward or downward, the guide bar 621 is supported by the guide hole 631 so that the lift bracket 620 may stably move upward or downward.

The guide hole 631 may include a lift part 631*a* extending along a height direction and a height fixing part 631*b* configured to support the lift bracket 620 to fix a height thereof while the lift bracket has moved upward to a certain height.

That is, as shown in FIGS. 13A and 13B, the lift part 631*a* is configured to have an inclination so as to allow the guide bar 621 to move upward along the lift part 631*a*. When the guide bar 621 moves to an upper end of the lift part 631*a*, upward movement of the lift bracket 620 is finished. After the upward movement of the lift bracket 620 is finished, in order to stably support a load applied to the auxiliary portion 20, the height fixing part 631*b* configured to fix the height of the lift bracket 620 may be formed to extend from the upper end of the lift part 631*a*.

In addition, in this state, in order to allow the lift bracket 620 to move downward again, the guide bar 621 is configured to move downward along the lift part 631*a*. When the guide bar 621 moves to a lower end of the lift part 631*a*, downward movement of the lift bracket 620 is finished. After the downward movement of the lift bracket 620 is finished as described above, in order to support a load applied to the auxiliary portion 20, the height fixing part 631*b* configured to fix the height of the lift bracket 620 may be formed to extend from the lower end of the lift part 631*a*.

The height fixing part 631*b* may be formed to allow the guide bar 621 to be horizontally movable by a certain distance. That is, the lift part 631*a* is formed to have an upward inclination to allow the guide bar 621 to move upward or downward and the height fixing part 631*b* is formed to extend in a lateral direction of the auxiliary portion 20 to allow the guide bar 621 to be horizontally movable by a certain distance. A part where the lift part 631*a* and the height fixing part 631*b* are connected to each other to allow the guide bar 621 to be smoothly movable thereover may be formed to have a curved shape.

As shown in FIGS. 13A and 13B, the driving shaft 510 may include a pinion 511, the guide bracket 630 may include a rack 632 configured to allow the guide bracket 630 to move in a width direction when the pinion 511 rotates, and the lift part 631*a* may have an inclination to allow the lift bracket 620 to move upward while the guide bracket 630 moves in the width direction.

That is, since the driving shaft 510 includes the pinion 511 to transfer a driving force of the motor 500 and the guide bracket 630 includes the rack 632 engaged with the pinion 511, the rack 632 moves laterally in the width direction according to rotation of the pinion 511. In addition, when the rack 632 moves, the guide bracket 630 moves simultaneously. Accordingly, as the guide hole 631 formed in the guide bracket 630 moves, a relative position of the guide bar 621 inserted into the guide hole 631 changes, and thus the lift bracket 620 moves upward or downward.

When the driving force of the motor 500 is transferred using the rack 632 and the pinion 511 as described above, the driving force may be effectively transferred without a loss.

As shown in FIGS. 13A and 13B, the guide bracket 630 is provided on each of both sides in the width direction on the basis of the motor 500. The guide brackets 630 may be provided on both sides of the lift bracket 620. Further, the guide bars 621 inserted into the guide holes 631 formed in a plurality of such guide brackets 630 are provided on both sides of the lift bracket 620. Due to being configured as described above, the lift bracket 620 may stably move upward or downward without being tilted toward any one side.

In addition, in order to effectively move the plurality of guide brackets 630, the above racks 632 may be provided on each thereof.

Here, the driving shaft 510 may include a single pinion 511, a plurality of such racks 632 include a first rack 632*a* provided on one side in the width direction on the basis of the motor 500 and a second rack 632*b* provided on the other side, and the first rack 632*a* and the second rack 632*b* may be disposed in front and rear of the pinion 511, respectively.

Furthermore, the first rack 632*a* and the second rack 632*b* are configured to move in a direction to be closer to or farther from the pinion 511 according to a rotation direction of the pinion 511.

When configured as described above, since both the first rack 632*a* and the second rack 632*b* may be moved using the driving shaft 510 provided in a single motor 500, a configuration is simplified, and the first rack 632*a* and the second rack 632*b* move face each other at the same speed so that an upward or downward operation of the lift bracket 620 may be performed smoothly.

Figure 14A:
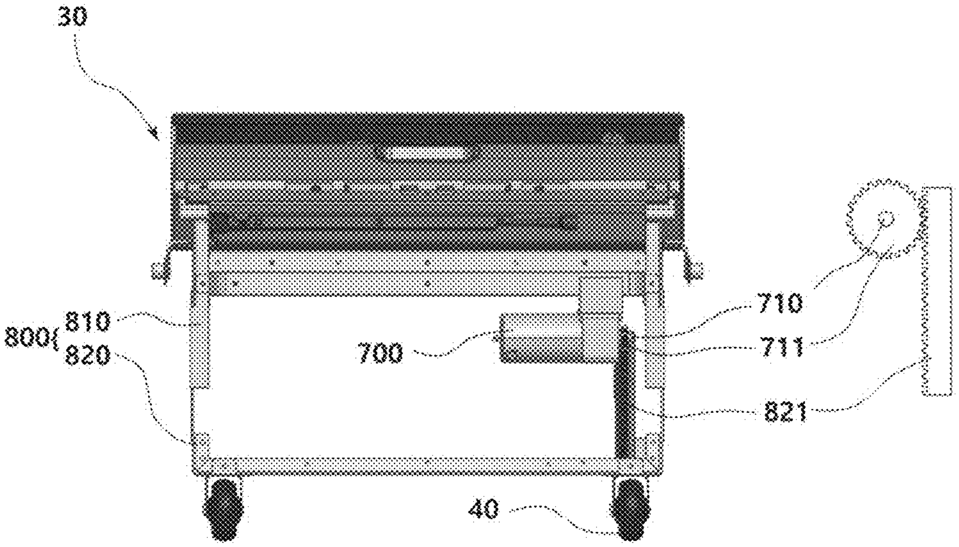
Figure 14B:
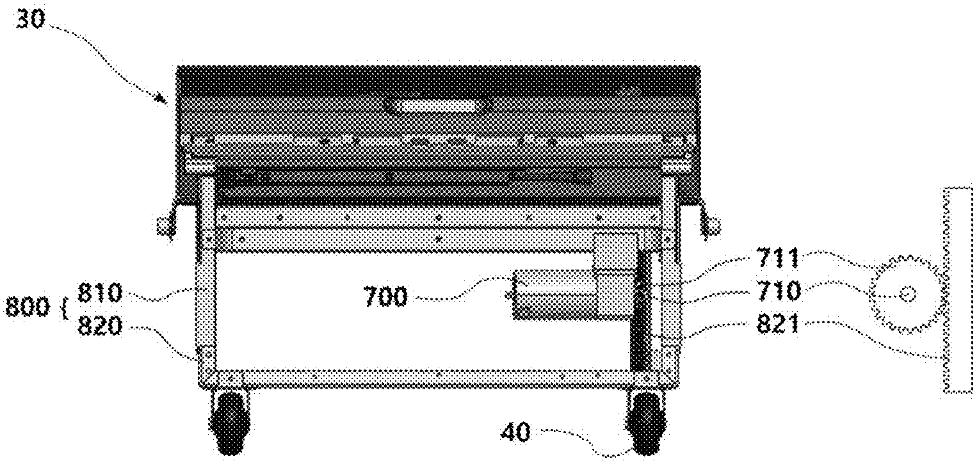
Figure 15B:
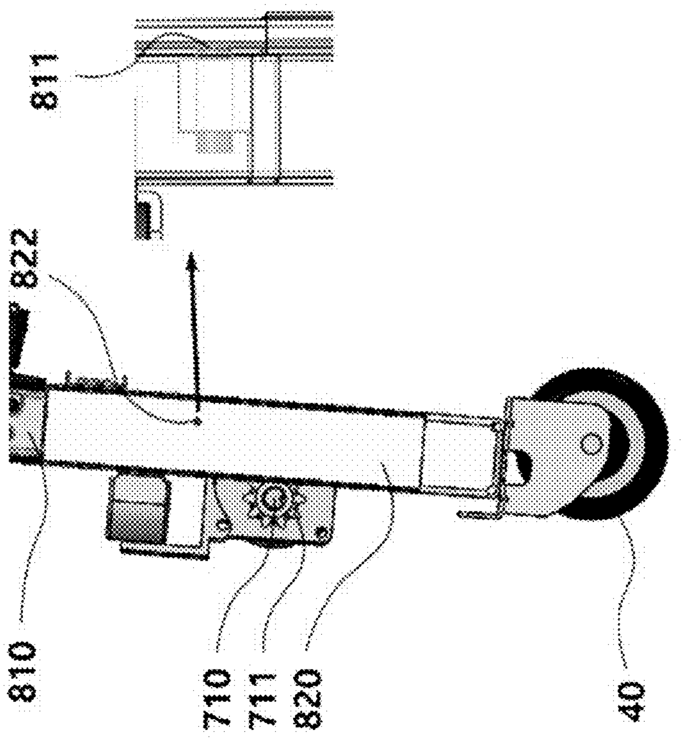
Figure 15A:
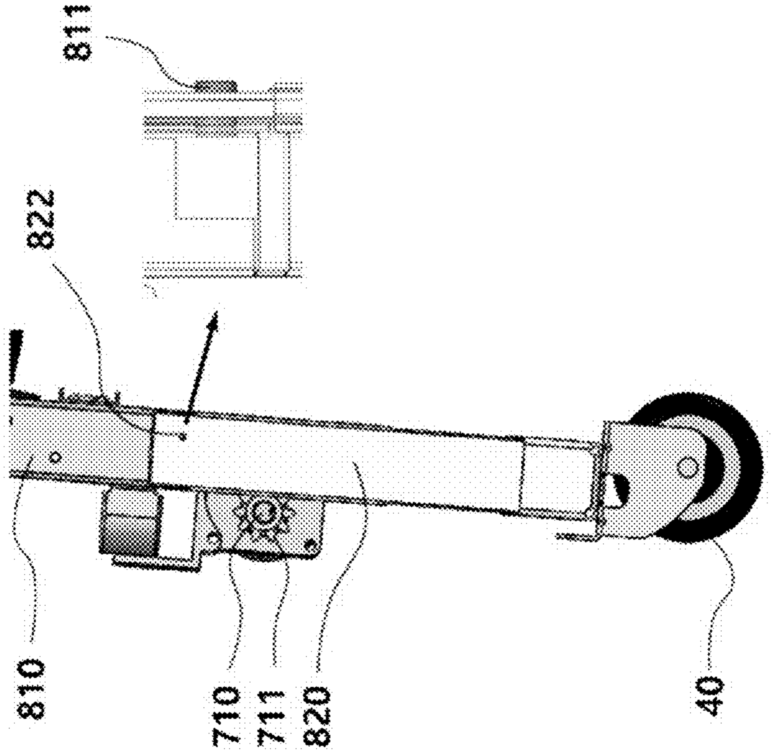

FIGS. 14A, 14B, 15A, and 15B are views illustrating a lifting member according to a ninth embodiment of the present disclosure, wherein FIG. 14A is a perspective view illustrating a state in which a height of the auxiliary portion becomes higher to store the massage apparatus, FIG. 14B is a perspective view illustrating a state in which the height of the auxiliary portion becomes lower to use the massage apparatus, FIG. 15A is a side view illustrating the state in which the height of the auxiliary portion becomes higher to store the massage apparatus, and FIG. 15B is a side view illustrating the state in which the height of the auxiliary portion becomes lower to use the massage apparatus.

As shown in FIGS. 14A and 14B, the lifting member 30 includes a motor 700 including a driving shaft 710 and a wheel bracket assembly 800 connected to the driving shaft 710 and adjusted in height. Here, the wheel bracket assembly 800 may include a support bracket 810 to which the motor 700 is fixed and may include a lift bracket 820 adjusted in height according to an operation of the motor 700. The driving shaft 710 may include a pinion 711, and the lift bracket 820 may include a rack 821 adjusted in height according to a rotation direction of the pinion 711.

That is, the driving shaft 710 of the motor 700 is disposed in a lateral width direction of the auxiliary portion 20. The driving shaft 710 includes the pinion 711 so as to transfer a driving force of the motor 700, and the lift bracket 820 includes the rack 821 engaged with the pinion 711 so as to move the lift bracket 820 upward or downward.

That is, as shown in FIG. 14A, when the lift bracket 820 moves downward, a height of the auxiliary portion 20 becomes relatively high. Accordingly, the auxiliary portion 20 is moved in a sliding manner above the body portion 10 while the height of the auxiliary portion 20 becomes higher after using the massage apparatus.

On the other hand, as shown in FIG. 15B, when the lift bracket 820 moves upward, the height of the auxiliary portion 20 becomes relatively low. When the auxiliary portion 20 is moved in a sliding manner to use the massage apparatus, the height of the auxiliary portion 20 becomes lower so that the body portion 10 and the auxiliary portion 20 may be kept horizontal.

When it is configured that the driving force of the motor 700 is directly transferred to the lift bracket 820 through the pinion 711 and the rack 821, a configuration may be simplified and a loss occurring in a driving force transfer process may be minimized.

Here, as shown in FIGS. 15A and 15B, the support bracket 810 includes a fixing bar 811 formed to pass through the lift bracket 820, and the lift bracket 820 includes a fixing hole 822 formed to allow the fixing bar 811 to pass therethrough.

When the fixing bar 811 formed on the support bracket 810 passes through the fixing hole 822 formed in the lift bracket 820 as described above, a height of the auxiliary portion 20 is stably fixed even when a load is applied to the auxiliary portion 20.

The fixing hole 822 may be formed at a position where an upward or downward operation of the lift bracket 820 is finished. The fixing hole 822 may be formed in each of an upper side and a lower side of the lift bracket 820 to fix the lift bracket 820 while the lift bracket 820 has moved upward or downward.

Additionally, the support bracket 810 may include an elastic spring configured to apply an elastic force in a direction in which the fixing bar 811 passes through the fixing hole 822. That is, the fixing bar 811 is configured at a part where the fixing hole 822 is not formed to pressurize an inner circumferential surface of the lift bracket 820. When the lift bracket 820 moves upward or downward to a position at which the fixing hole is formed as the lift bracket 820 moves upward or downward, the fixing bar 811 moves due to the elastic spring and passes through the fixing hole 822.

In addition, in order to allow the lift bracket 820 to move upward or downward while the height of the lift bracket 820 is fixed, it is necessary to release the fixing bar 811 passing through the lift bracket 820. To this end, the support bracket 810 may include a restoration member configured to move the fixing bar 811 in a direction opposite the direction in which the fixing bar 811 passes through the fixing hole 822 (a backward movement direction). As the restoration member, an electromagnet may be used. Only when the fixing bar 811 moves in the backward movement direction, are currents applied to the restoration member so as to release the state of the fixing bar 811 passing therethrough.

Figure 16A:
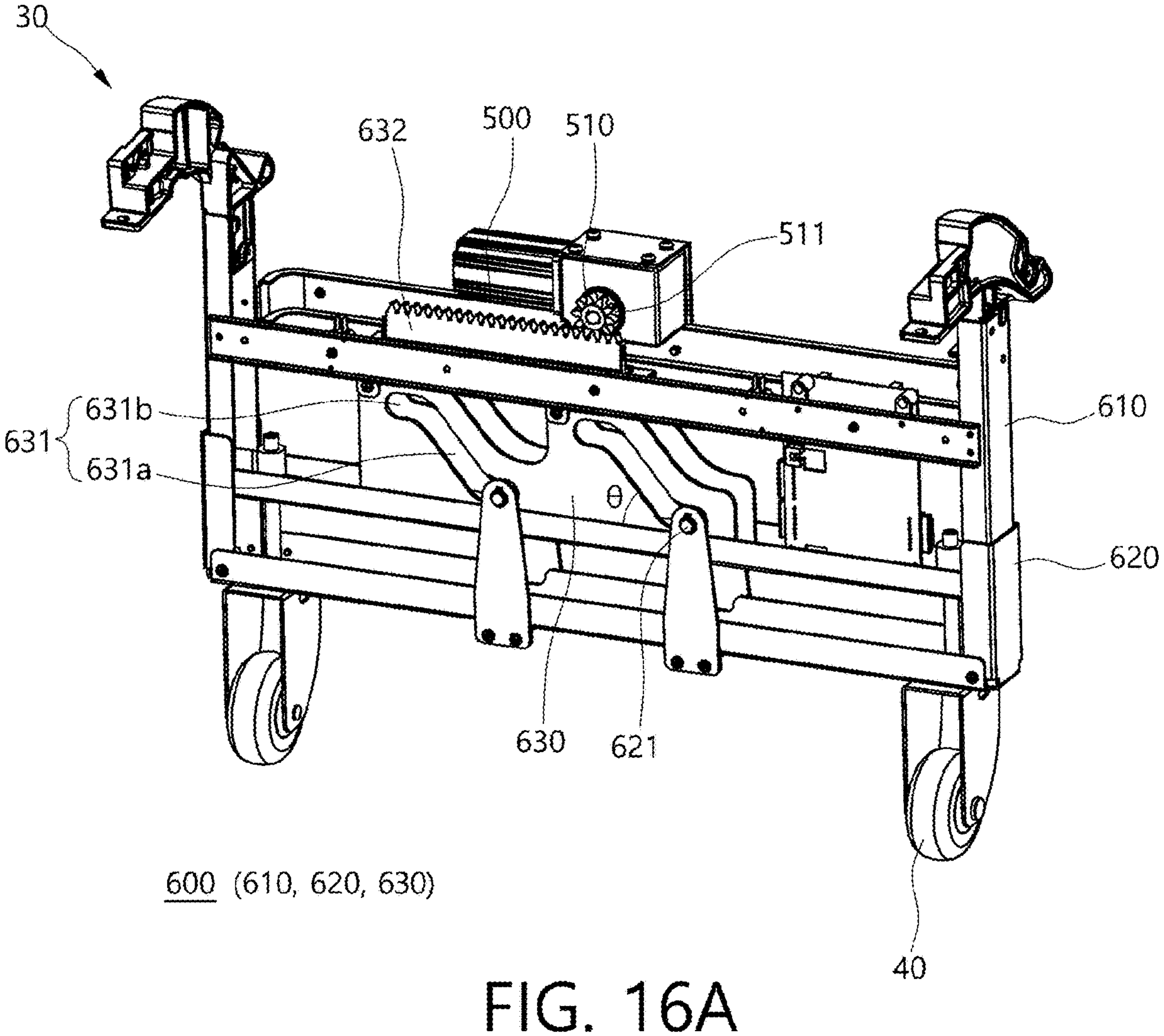
Figure 16B:
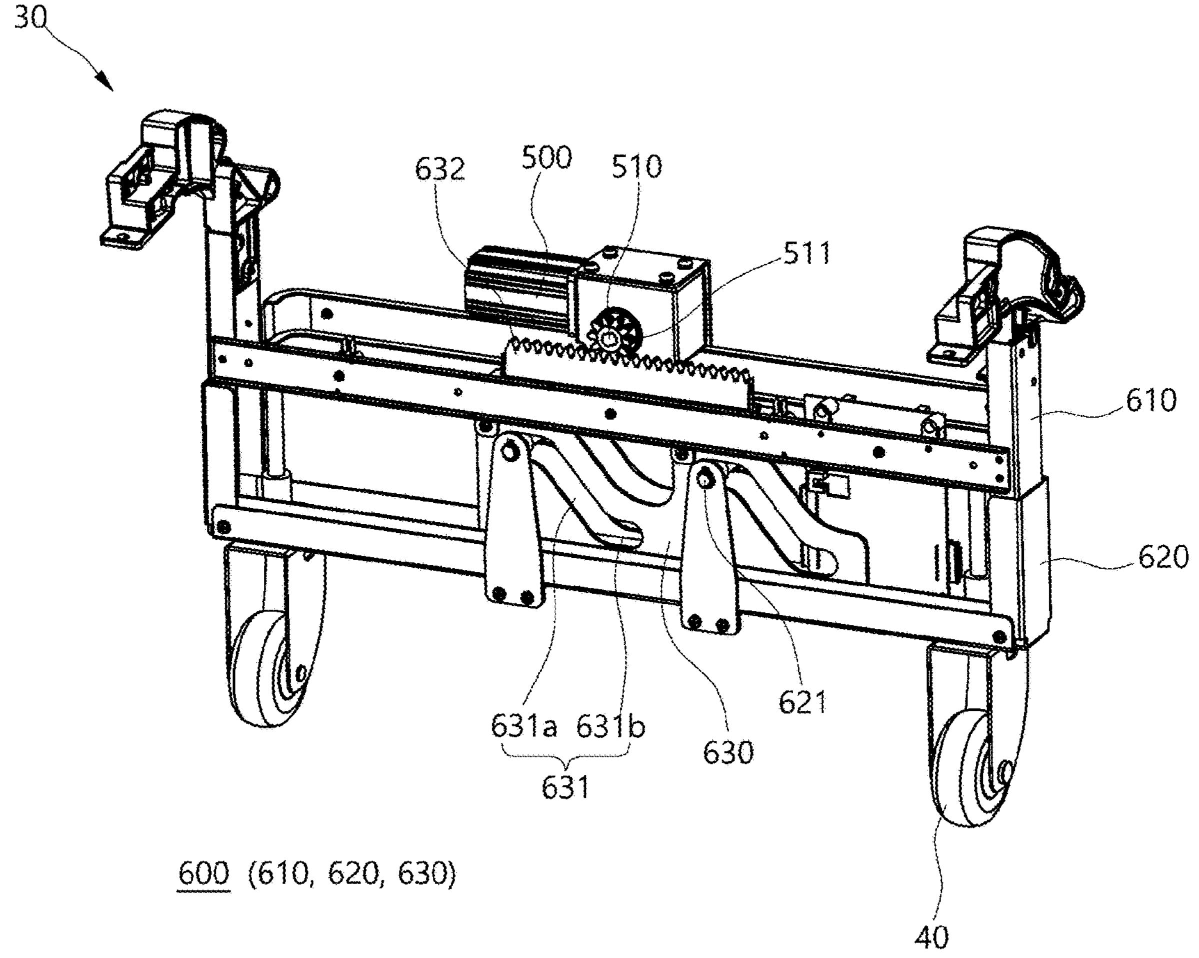

FIGS. 16A and 16B are views illustrating a lifting member according to a tenth embodiment of the present disclosure, wherein FIG. 16A is a perspective view illustrating a state in which a height of the auxiliary portion becomes higher to store the massage apparatus, and FIG. 16B is a perspective view illustrating a state in which the height of the auxiliary portion becomes lower to use the massage apparatus.

As shown in FIGS. 16A and 16B, the driving shaft 510 of the motor 500 is configured to be disposed in a front-rear direction of the auxiliary portion 20. In this state, when the driving shaft 510 rotates, a driving force is applied to a lateral direction of the auxiliary portion 20. The guide bracket 630 is provided to move the lift bracket 620 upward or downward using the driving force.

Since the guide bracket 630 includes the guide hole 631 and the guide bar 621 provided in the lift bracket 620 is inserted into and disposed in the guide hole 631, the lift bracket 620 moves upward or downward according to movement of the guide bracket 630. The lift part 631*a* and the height fixing part 631*b* are formed on the guide hole 631. Here, an inclination $\theta$ for allowing the guide bar 621 to move upward or downward is formed on the lift part 631*a*.

In addition, the driving shaft 510 includes the pinion 511 to transfer the driving force of the motor 500 and the rack 632 is fixed to the guide bracket 630 to transfer the driving force using a rack-pinion manner so as to effectively transfer the driving force without a loss.

According to the present disclosure, in a massage apparatus, since it is possible to adjust a height of an auxiliary portion according to a storage state or a use state of the massage apparatus, the massage apparatus may be stably stored. When the massage apparatus is in use, a body portion and the auxiliary portion are kept horizontal so that a user may receive massages while being comfortable.

Further, since wheels are provided on the auxiliary portion to allow the auxiliary portion to move in a sliding manner with ease and always support the ground through adjusting a height of the auxiliary portion, the auxiliary portion may easily move in a sliding manner regardless of a storage state or a use state of the massage apparatus.

In addition, since the height of the auxiliary portion is adjusted to be higher than the body portion as necessary, blood circulation of a user may be performed smoothly.

Although the embodiments of the present disclosure have been described above, the concept of the present disclosure is not limited to the embodiment disclosed herein and it should be understood that one of ordinary skill in the art who understands the concept of the present disclosure may easily provide other embodiments through addition, changes, elimination, and the like of components without departing from the scope of the same concept which will be included in the scope of the concept of the present disclosure.

What is claimed is:

1. An apparatus for supporting a body of a user lying thereon during massage, the apparatus comprising:
- a body portion configured to support an upper body of the user; and
- an auxiliary portion connected to the body portion to support a lower body of the user,
- wherein the auxiliary portion comprises a lifting member configured to adjust a height of the auxiliary portion,
- wherein the lifting member comprises:
  - a motor comprising a driving shaft, and
  - a wheel bracket assembly connected to the driving shaft and configured to be adjusted in height, and
- wherein the wheel bracket assembly comprises:
  - a connection bracket configured to rotate with the driving shaft, and
  - a lift bracket connected to the connection bracket and adjusted in height.

2. The apparatus of claim 1, wherein, when the apparatus is not in use, the auxiliary portion is disposed above the body portion,
- wherein, when the apparatus is in use, the auxiliary portion is configured to move in a sliding manner in a longitudinal direction of the body portion to be disposed consecutively with the body portion, and
- wherein the lifting member is configured to adjust the height of the auxiliary portion to keep the auxiliary portion horizontal with the body portion.

3. The apparatus of claim 1, wherein the lift bracket comprises a guide hole extending along a width direction, and
- wherein the connection bracket comprises a guide bar inserted into the guide hole.

4. The apparatus of claim 3, wherein the guide hole extends toward one side in the width direction on the basis of the driving shaft, and
- wherein the motor operates to allow the driving shaft to rotate in one direction and in another direction.

5. The apparatus of claim 4, wherein the wheel bracket assembly further comprises a support bracket to which the motor is fixed,
- wherein a pair of support plates facing each other are disposed on each of the support bracket and the lift bracket, and
- wherein inner circumferential surfaces of any one pair of support plates come into contact with and support outer circumferential surfaces of another pair of support plates.

6. The apparatus of claim 4, wherein the wheel bracket assembly further comprises a support bracket to which the motor is fixed,
- wherein the lift bracket comprises a pair of support plates facing each other, and
- wherein the support bracket comprises guide rails slidably coupled to an inner circumferential surface of the lift bracket.

7. The apparatus of claim 6, wherein the driving shaft is provided in plurality in front and at rear of the motor,
- wherein a plurality of connection brackets are arranged to be fixed to the respective driving shafts, and
- wherein the guide bar is fixed to the plurality of connection brackets while simultaneously passing through the guide holes defined in the pair of support plates.

8. The apparatus of claim 7, wherein the support bracket comprises a detection sensor configured to detect a height of the lift bracket.

9. The apparatus of claim 8, wherein a first detection protrusion and a second detection protrusion, which are detected by the detection sensor, are disposed on the connection bracket are provided in front and the connection bracket provided in the rear, respectively,
- wherein, when the lift bracket moves downward to a certain height or lower, the detection sensor detects the first detection protrusion, and
- wherein, when the lift bracket moves upward to a certain height or higher, the detection sensor detects the second detection protrusion.

10. The apparatus of claim 9, wherein the support bracket comprises an auxiliary bracket configured to rotate with the connection bracket to adjust a height of the lift bracket.

11. The apparatus of claim 10, further comprising a transfer bracket to which the connection bracket and the auxiliary bracket are hinge-fixed to transfer a rotating force of the connection bracket to the auxiliary bracket.

12. The apparatus of claim 11, wherein a third support surface, which is configured to support a support bar disposed on each of the connection bracket and the auxiliary bracket when the lift bracket moves downward to a certain height or lower, is formed on the transfer bracket.

13. The apparatus of claim 5, wherein the driving shaft is provided in plural and disposed in front and at rear of the motor,
- wherein a plurality of connection brackets are arranged to be fixed to the respective driving shafts, and
- wherein the guide bar is fixed to the plurality of connection brackets while simultaneously passing through the guide holes defined in the pair of support plates.

14. The apparatus of claim 13, wherein the support bracket comprises a detection sensor configured to detect a height of the lift bracket.

15. The apparatus of claim 14, wherein a first detection protrusion and a second detection protrusion, which are detected by the detection sensor, are disposed on a connection bracket among the plurality of connection brackets provided in front of the motor and disposed on a connection bracket among the plurality of connection brackets provided in the rear of the motor, respectively, wherein, when the lift bracket moves downward to a certain height or lower, the detection sensor detects the first detection protrusion, and wherein, when the lift bracket moves upward to a certain height or higher, the detection sensor detects the second detection protrusion.

16. The apparatus of claim 15, wherein the support bracket comprises an auxiliary bracket configured to rotate with the connection bracket to adjust a height of the lift bracket.

17. The apparatus of claim 16, further comprising a transfer bracket to which the connection bracket and the auxiliary bracket are hinge-fixed to transfer a rotating force of the connection bracket to the auxiliary bracket.

18. The apparatus of claim 17, wherein a third support surface, which is configured to support a support bar disposed on each of the connection bracket and the auxiliary bracket when the lift bracket moves downward to a certain height or lower, is formed on the transfer bracket.

* * * * *